(12) United States Patent
Nihei et al.

(10) Patent No.: US 8,310,513 B2
(45) Date of Patent: Nov. 13, 2012

(54) LIGHT-SOURCE DRIVING DEVICE, OPTICAL SCANNING DEVICE, AND IMAGE FORMING APPARATUS

(75) Inventors: Yasuhiro Nihei, Kanagawa (JP); Masaaki Ishida, Kanagawa (JP); Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 410 days.

(21) Appl. No.: 12/693,775

(22) Filed: Jan. 26, 2010

(65) Prior Publication Data
US 2010/0214637 A1 Aug. 26, 2010

(30) Foreign Application Priority Data
Feb. 23, 2009 (JP) ................................ 2009-038974

(51) Int. Cl.
*B41J 2/47* (2006.01)
(52) U.S. Cl. ........................................ 347/235
(58) Field of Classification Search .................. 347/235; 359/204, 205.1; 358/471
See application file for complete search history.

(56) References Cited

U.S. PATENT DOCUMENTS

| | | | |
|---|---|---|---|
| 5,138,623 A | 8/1992 | Ema et al. | |
| 5,237,579 A | 8/1993 | Ema et al. | |
| 5,258,780 A | 11/1993 | Ema et al. | |
| 5,784,091 A | 7/1998 | Ema et al. | |
| 5,946,334 A | 8/1999 | Ema et al. | |
| 6,498,617 B1 | 12/2002 | Ishida et al. | |
| 6,731,317 B2 | 5/2004 | Ema et al. | |
| 6,791,596 B2 | 9/2004 | Nihei et al. | |
| 6,917,639 B2 | 7/2005 | Ishida et al. | |
| 7,256,815 B2 | 8/2007 | Suzuki et al. | |
| 7,271,824 B2 | 9/2007 | Omori et al. | |
| 7,327,379 B2 | 2/2008 | Nihei et al. | |
| 7,456,856 B2 | 11/2008 | Nihei | |
| 7,463,278 B2 | 12/2008 | Ozasa et al. | |
| 7,515,170 B2 | 4/2009 | Omori et al. | |
| 7,528,625 B2 | 5/2009 | Ozasa et al. | |
| 2005/0213623 A1 | 9/2005 | Ozasa et al. | |
| 2005/0219354 A1 | 10/2005 | Omori et al. | |
| 2006/0285186 A1* | 12/2006 | Ishida et al. | .................. 359/204 |
| 2007/0030548 A1 | 2/2007 | Nihei et al. | |
| 2007/0132828 A1 | 6/2007 | Ishida et al. | |
| 2007/0206234 A1* | 9/2007 | Ozasa et al. | .................. 358/471 |
| 2008/0088893 A1 | 4/2008 | Ishida et al. | |

(Continued)

FOREIGN PATENT DOCUMENTS
JP 2003-276234 A 9/2003

*Primary Examiner* — Laura Martin
*Assistant Examiner* — Carlos A Martinez
(74) *Attorney, Agent, or Firm* — Dickstein Shapiro LLP

(57) ABSTRACT

In a light-source driving device, a high-frequency clock generating circuit generates two high-frequency clock signals having mutually different phases, an image-data creating circuit creates a plurality of image data corresponding to a plurality of light-emitting units according to image information, and a write control circuit creates a plurality of modulated data corresponding to the light-emitting units from the plurality of image data and separately controls output timings of the plurality of modulated data by using a time, as a unit, corresponding to a phase difference between the two high-frequency clock signals. The write control circuit includes two data switching circuits that set a correspondence relation between image data and PWM data based on one of a relation between an array of the light-emitting units and an array of a plurality of light spots and a relation between a surface to be scanned and a main scanning direction.

14 Claims, 36 Drawing Sheets

U.S. PATENT DOCUMENTS

| | | |
|---|---|---|
| 2008/0123160 A1 | 5/2008 | Omori et al. |
| 2008/0174915 A1 | 7/2008 | Hipwell et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0267663 A1 | 10/2008 | Ichii et al. |
| 2008/0284838 A1 | 11/2008 | Suzuki et al. |
| 2008/0291259 A1 | 11/2008 | Nihei et al. |
| 2008/0298842 A1 | 12/2008 | Ishida et al. |
| 2009/0091805 A1 | 4/2009 | Tanabe et al. |
| 2009/0167837 A1 | 7/2009 | Ishida et al. |
| 2009/0174915 A1 | 7/2009 | Nihei et al. |
| 2009/0195635 A1 | 8/2009 | Ishida et al. |
| 2009/0231656 A1 | 9/2009 | Suzuki et al. |
| 2009/0303451 A1 | 12/2009 | Miyake et al. |

* cited by examiner

| | MAIN SCANNING DIRECTION | ARRAY OF LIGHT SPOTS |
|---|---|---|
| CASE-1 | -Y DIRECTION | ARRAY SAME AS ARRAY OF LIGHT-EMITTING UNITS (ARRAY A) |
| CASE-2 | +Y DIRECTION | ARRAY SAME AS ARRAY OF LIGHT-EMITTING UNITS (ARRAY A) |
| CASE-3 | -Y DIRECTION | VERTICALLY INVERTED ARRAY OF ARRAY OF LIGHT-EMITTING UNITS (ARRAY B) |
| CASE-4 | +Y DIRECTION | VERTICALLY INVERTED ARRAY OF ARRAY OF LIGHT-EMITTING UNITS (ARRAY B) |

FIG. 8
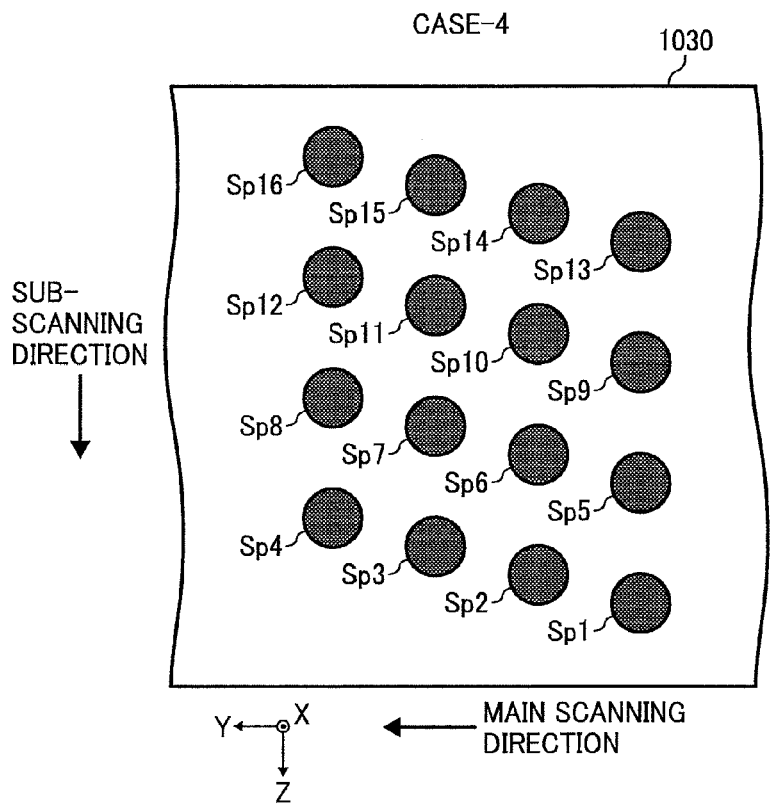
FIG. 9
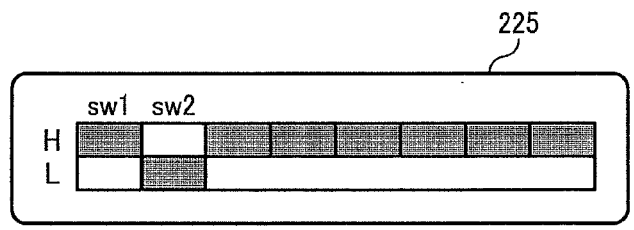
FIG. 10
|  | CASE-1 | CASE-2 | CASE-3 | CASE-4 |
|---|---|---|---|---|
| Ssw1 | L | H | H | L |
| Ssw2 | L | H | L | H |

FIG. 16

|  | CASE-1 CASE-4 | CASE-2 CASE-3 |
|---|---|---|
|  | Ssw1=L | Ssw1=H |
| In1 | $S216_1$ | $S216_{16}$ |
| In2 | $S216_5$ | $S216_{12}$ |
| In3 | $S216_9$ | $S216_8$ |
| In4 | $S216_{13}$ | $S216_4$ |
| In5 | $S216_2$ | $S216_{15}$ |
| In6 | $S216_6$ | $S216_{11}$ |
| In7 | $S216_{10}$ | $S216_7$ |
| In8 | $S216_{14}$ | $S216_3$ |
| In9 | $S216_3$ | $S216_{14}$ |
| In10 | $S216_7$ | $S216_{10}$ |
| In11 | $S216_{11}$ | $S216_6$ |
| In12 | $S216_{15}$ | $S216_2$ |
| In13 | $S216_4$ | $S216_{13}$ |
| In14 | $S216_8$ | $S216_9$ |
| In15 | $S216_{12}$ | $S216_5$ |
| In16 | $S216_{16}$ | $S216_1$ |

FIG. 25

| IMAGE DATA | MODULATED DATA bit15 ............ bit0 |
|---|---|
| 0000 | 0000000000000000 |
| 0001 | 0000000000000001 |
| 0010 | 0000000000000011 |
| 0011 | 0000000000000111 |
| 0100 | 0000000000001111 |
| 0101 | 0000000000011111 |
| 0110 | 0000000000111111 |
| 0111 | 0000000001111111 |
| 1000 | 0000000011111111 |
| 1001 | 0000000111111111 |
| 1010 | 0000001111111111 |
| 1011 | 0000011111111111 |
| 1100 | 0000111111111111 |
| 1101 | 0001111111111111 |
| 1110 | 0011111111111111 |
| 1111 | 0111111111111111 |

FIG. 26

| CORRECTION DATA bit3-0 | MODULATED DATA [15:0] |
|---|---|
| 0000 | {MODULATED DATA A [15:0]} |
| 0001 | {MODULATED DATA A [14:0], {MODULATED DATA B [15]}} |
| 0010 | {MODULATED DATA A [13:0], {MODULATED DATA B [15:14]}} |
| 0011 | {MODULATED DATA A [12:0], {MODULATED DATA B [15:13]}} |
| 0100 | {MODULATED DATA A [11:0], {MODULATED DATA B [15:12]}} |
| 0101 | {MODULATED DATA A [10:0], {MODULATED DATA B [15:11]}} |
| 0110 | {MODULATED DATA A [9:0], {MODULATED DATA B [15:10]}} |
| 0111 | {MODULATED DATA A [8:0], {MODULATED DATA B [15:9]}} |
| 1000 | {MODULATED DATA A [7:0], {MODULATED DATA B [15:8]}} |
| 1001 | {MODULATED DATA A [6:0], {MODULATED DATA B [15:7]}} |
| 1010 | {MODULATED DATA A [5:0], {MODULATED DATA B [15:6]}} |
| 1011 | {MODULATED DATA A [4:0], {MODULATED DATA B [15:5]}} |
| 1100 | {MODULATED DATA A [3:0], {MODULATED DATA B [15:4]}} |
| 1101 | {MODULATED DATA A [2:0], {MODULATED DATA B [15:3]}} |
| 1110 | {MODULATED DATA A [1:0], {MODULATED DATA B [15:2]}} |
| 1111 | {MODULATED DATA A [0], {MODULATED DATA B [15:1]}} |

FIG. 28

|  | CASE-1 CASE-3 | CASE-2 CASE-4 |
|---|---|---|
|  | Ssw2=L | Ssw2=H |
| Dr1 | $Sb_1$ | $Sb_{16}$ |
| Dr5 | $Sb_5$ | $Sb_{12}$ |
| Dr9 | $Sb_9$ | $Sb_8$ |
| Dr13 | $Sb_{13}$ | $Sb_4$ |
| Dr2 | $Sb_2$ | $Sb_{15}$ |
| Dr6 | $Sb_6$ | $Sb_{11}$ |
| Dr10 | $Sb_{10}$ | $Sb_7$ |
| Dr14 | $Sb_{14}$ | $Sb_3$ |
| Dr3 | $Sb_3$ | $Sb_{14}$ |
| Dr7 | $Sb_7$ | $Sb_{10}$ |
| Dr11 | $Sb_{11}$ | $Sb_6$ |
| Dr15 | $Sb_{15}$ | $Sb_2$ |
| Dr4 | $Sb_4$ | $Sb_{13}$ |
| Dr8 | $Sb_8$ | $Sb_9$ |
| Dr12 | $Sb_{12}$ | $Sb_5$ |
| Dr16 | $Sb_{16}$ | $Sb_1$ |

FIG. 33A
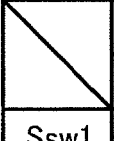
FIG. 33B
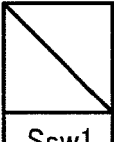
FIG. 34
| Ssw1 | Ssw2 | OUTPUT SIGNAL OF EOR CIRCUIT |
|---|---|---|
| L | L | L |
| L | H | H |
| H | L | H |
| H | H | L |

FIG. 35

| COLUMN OF LIGHT-EMITTING PORTIONS | DISTANCE [μm] FROM 1st-COLUMN LIGHT-EMITTING PORTION IN M DIRECTION | POSITION [μm] OF LIGHT SPOT ON SURFACE TO BE SCANNED FROM 1st-COLUMN SPOT IN MAIN SCANNING DIRECTION | | | POSITION (PIXELS)※ OF LIGHT SPOT ON SURFACE TO BE SCANNED FROM 1st-COLUMN SPOT IN MAIN SCANNING DIRECTION | | |
|---|---|---|---|---|---|---|---|
| | | MAGNIFICATION =4 | MAGNIFICATION =5 | MAGNIFICATION =6 | MAGNIFICATION =4 | MAGNIFICATION =5 | MAGNIFICATION =6 |
| 2nd COLUMN | 30 | 120 | 150 | 180 | 5.7 | 7.1 | 8.6 |
| 3rd COLUMN | 60 | 240 | 300 | 360 | 11.4 | 14.3 | 17.1 |
| 4th COLUMN | 90 | 360 | 450 | 540 | 17.1 | 21.4 | 25.7 |

※ NUMBER OF PIXELS IN 1200 dpi (21 μm/dot)

FIG. 36

| COLUMN OF LIGHT-EMITTING PORTIONS | REQUIRED NUMBER OF STAGES IN SHIFT REGISTER | SHIFT REGISTER OF WHICH OUTPUT SIGNAL IS TARGET FOR SELECTION |
|---|---|---|
| 2nd COLUMN | 9 | 5th STAGE TO 9th STAGE |
| 3rd COLUMN | 18 | 11th STAGE TO 18th STAGE |
| 4th COLUMN | 26 | 17th STAGE TO 26th STAGE |

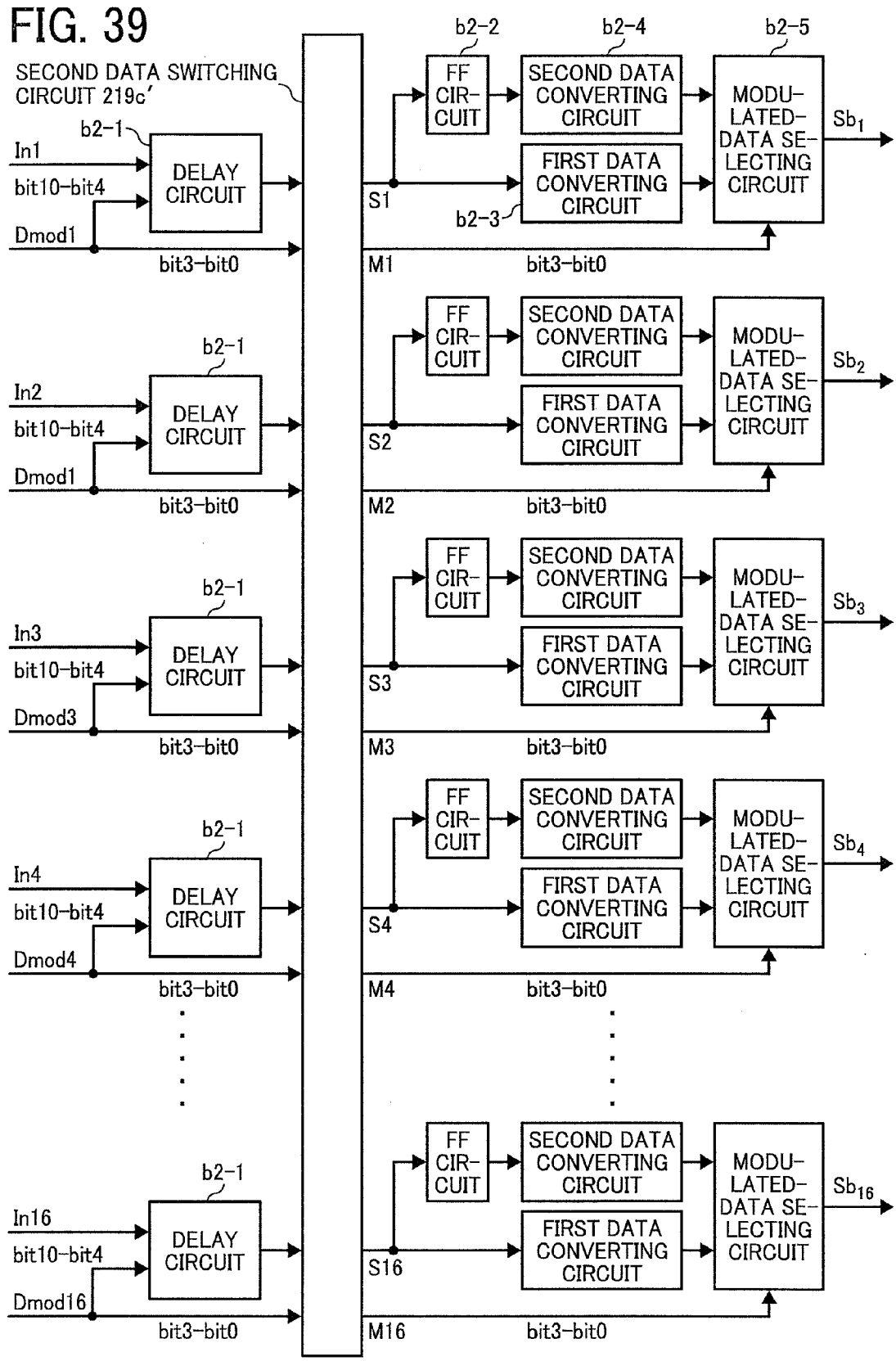

FIG. 40

| | CASE-1<br>CASE-3 | CASE-2<br>CASE-4 |
|---|---|---|
| | Scw2=L | Scw2=H |
| S1<br>M1 | ch1 DELAYED IMAGE DATA A<br>ch1 CORRECTION DATA (bit 0-4) | ch16 DELAYED IMAGE DATA A<br>ch16 CORRECTION DATA (bit 0-4) |
| S2<br>M2 | ch2 DELAYED IMAGE DATA A<br>ch2 CORRECTION DATA (bit 0-4) | ch15 DELAYED IMAGE DATA A<br>ch15 CORRECTION DATA (bit 0-4) |
| S3<br>M3 | ch3 DELAYED IMAGE DATA A<br>ch3 CORRECTION DATA (bit 0-4) | ch14 DELAYED IMAGE DATA A<br>ch14 CORRECTION DATA (bit 0-4) |
| S4<br>M4 | ch4 DELAYED IMAGE DATA A<br>ch4 CORRECTION DATA (bit 0-4) | ch13 DELAYED IMAGE DATA A<br>ch13 CORRECTION DATA (bit 0-4) |
| S5<br>M5 | ch5 DELAYED IMAGE DATA A<br>ch5 CORRECTION DATA (bit 0-4) | ch12 DELAYED IMAGE DATA A<br>ch12 CORRECTION DATA (bit 0-4) |
| S6<br>M6 | ch6 DELAYED IMAGE DATA A<br>ch6 CORRECTION DATA (bit 0-4) | ch11 DELAYED IMAGE DATA A<br>ch11 CORRECTION DATA (bit 0-4) |
| S7<br>M7 | ch7 DELAYED IMAGE DATA A<br>ch7 CORRECTION DATA (bit 0-4) | ch10 DELAYED IMAGE DATA A<br>ch10 CORRECTION DATA (bit 0-4) |
| S8<br>M8 | ch8 DELAYED IMAGE DATA A<br>ch8 CORRECTION DATA (bit 0-4) | ch9 DELAYED IMAGE DATA A<br>ch9 CORRECTION DATA (bit 0-4) |
| S9<br>M9 | ch9 DELAYED IMAGE DATA A<br>ch9 CORRECTION DATA (bit 0-4) | ch8 DELAYED IMAGE DATA A<br>ch8 CORRECTION DATA (bit 0-4) |
| S10<br>M10 | ch10 DELAYED IMAGE DATA A<br>ch10 CORRECTION DATA (bit 0-4) | ch7 DELAYED IMAGE DATA A<br>ch7 CORRECTION DATA (bit 0-4) |
| S11<br>M11 | ch11 DELAYED IMAGE DATA A<br>ch11 CORRECTION DATA (bit 0-4) | ch6 DELAYED IMAGE DATA A<br>ch6 CORRECTION DATA (bit 0-4) |
| S12<br>M12 | ch12 DELAYED IMAGE DATA A<br>ch12 CORRECTION DATA (bit 0-4) | ch5 DELAYED IMAGE DATA A<br>ch5 CORRECTION DATA (bit 0-4) |
| S13<br>M13 | ch13 DELAYED IMAGE DATA A<br>ch13 CORRECTION DATA (bit 0-4) | ch4 DELAYED IMAGE DATA A<br>ch4 CORRECTION DATA (bit 0-4) |
| S14<br>M14 | ch14 DELAYED IMAGE DATA A<br>ch14 CORRECTION DATA (bit 0-4) | ch3 DELAYED IMAGE DATA A<br>ch3 CORRECTION DATA (bit 0-4) |
| S15<br>M15 | ch15 DELAYED IMAGE DATA A<br>ch15 CORRECTION DATA (bit 0-4) | ch2 DELAYED IMAGE DATA A<br>ch2 CORRECTION DATA (bit 0-4) |
| S16<br>M16 | ch16 DELAYED IMAGE DATA A<br>ch16 CORRECTION DATA (bit 0-4) | ch1 DELAYED IMAGE DATA A<br>ch1 CORRECTION DATA (bit 0-4) |

LIGHT-SOURCE DRIVING DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2009-038974 filed in Japan on Feb. 23, 2009.

BACKGROUND OF THE INVENTION

1. Field of the Invention

The present invention relates to a light-source driving device, an optical scanning device, and an image forming apparatus. More particularly, the present invention relates to a light-source driving device that drives a plurality of light-emitting units, an optical scanning device including the light-source driving device, and an image forming apparatus provided with the optical scanning device.

2. Description of the Related Art

In image forming apparatuses such as laser printers and digital copiers, there has been an increasing demand for improving image forming speed (speeding up) and writing density (higher image quality). As one of methods for responding to this demand, a method of using a multibeam light source capable of emitting a plurality of light fluxes to scan a surface to be scanned with the plurality of light fluxes has been considered.

Incidentally, in the multibeam light source having a plurality of light emitting units, in order to narrow an interval between scan lines, the light emitting units are mutually shifted from each other with respect to a direction corresponding to a main scanning direction. In this configuration, to align write start positions in a plurality of scan lines, it is necessary to control a turn-on timing of each of the light-emitting units.

For example, Japanese Patent Application Laid-open No. 2003-276234 discloses an image forming apparatus that includes a control unit. This control unit controls turn-on of a plurality of light-emitting units in a light source unit by determining a turn-on timing of at least one of the light-emitting units in the light source unit based on an image clock generated in synchronization with a detection signal of a synchronous detection unit, and determines turn-on timings of the other light-emitting units by changing a count value of the image clock.

SUMMARY OF THE INVENTION

It is an object of the present invention to at least partially solve the problems in the conventional technology.

According to an aspect of the present invention, there is provided a light-source driving device used for driving a plurality of light-emitting units in an optical scanning device that optically scans a surface to be scanned with light fluxes emitted from the plurality of light-emitting units in a main scanning direction. The light-source driving device includes a high-frequency clock generating circuit that generates a plurality of high-frequency clock signals having mutually different phases; a write-data creating circuit that creates a plurality of write data corresponding to the plurality of light-emitting units according to image information; a modulated-data control circuit that creates a plurality of modulated data corresponding to the plurality of light-emitting units from the plurality of write data based on at least one of a relation between an array of the plurality of light-emitting units and an array of a plurality of light spots formed on the surface to be scanned and a relation between the surface to be scanned and the main scanning direction, and separately controls output timings of the plurality of modulated data using a time, as a unit, corresponding to a phase difference between the plurality of high-frequency clock signals; and a driving circuit that drives the plurality of light-emitting units based on the plurality of modulated data output from the modulated-data control circuit.

According to another aspect of the present invention, there is provided an optical scanning device that scans a surface to be scanned with a plurality of light fluxes in a main scanning direction. The optical scanning device includes a light source that includes a plurality of light-emitting units arrayed so that their positions with respect to a direction corresponding to at least a direction of a scan line are mutually different from each other; the above light-source driving device according that drives the light source; and an optical system that collects the plurality of light fluxes emitted from the light source on the surface to be scanned, and moves a plurality of light spots on the surface to be scanned in the main scanning direction.

According to still another aspect of the present invention, there is provided an image forming apparatus including at least one image carrier; and at least one optical scanning device mentioned above to scan a light flux modulated according to image information to the at least one image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram for explaining CASE-4 in FIG. 4;

FIG. 9 is a diagram for explaining a DIP switch;

FIG. 10 is a diagram for explaining settings of a signal Ssw1 and a signal Ssw2;

FIG. 16 is a diagram for explaining results of determination in a first data switching circuit;

FIG. 25 is a table for explaining a relation between image data and modulated data;

FIG. 26 is a table for explaining a relation between lower-order 4 bits of correction data and modulated data output from a modulated-data selecting circuit;

FIG. 28 is a table for explaining results of determination in a second data switching circuit;

FIG. 33A is a table for explaining setting of the signal Ssw1 when the write control circuit in FIG. 32 is used;

FIG. 33B is a table for explaining setting of the signal Ssw2 when the write control circuit in FIG. 32 is used;

FIG. 34 is a diagram for explaining a configuration of an EOR circuit in FIG. 32;

FIG. 35 is a table (part 1) for explaining a modification of a delay circuit in the data creating/correcting circuit;

FIG. 36 is a table (part 2) for explaining the modification of the delay circuit in the data creating/correcting circuit;

FIG. 39 is a diagram for explaining a modification of the second data switching circuit;

FIG. 40 is a table for explaining results of determination in the second data switching circuit of FIG. 39.

DETAILED DESCRIPTION OF THE PREFERRED EMBODIMENTS

Exemplary embodiments of the present invention are explained below with reference to accompanying drawings.

Figure 1:
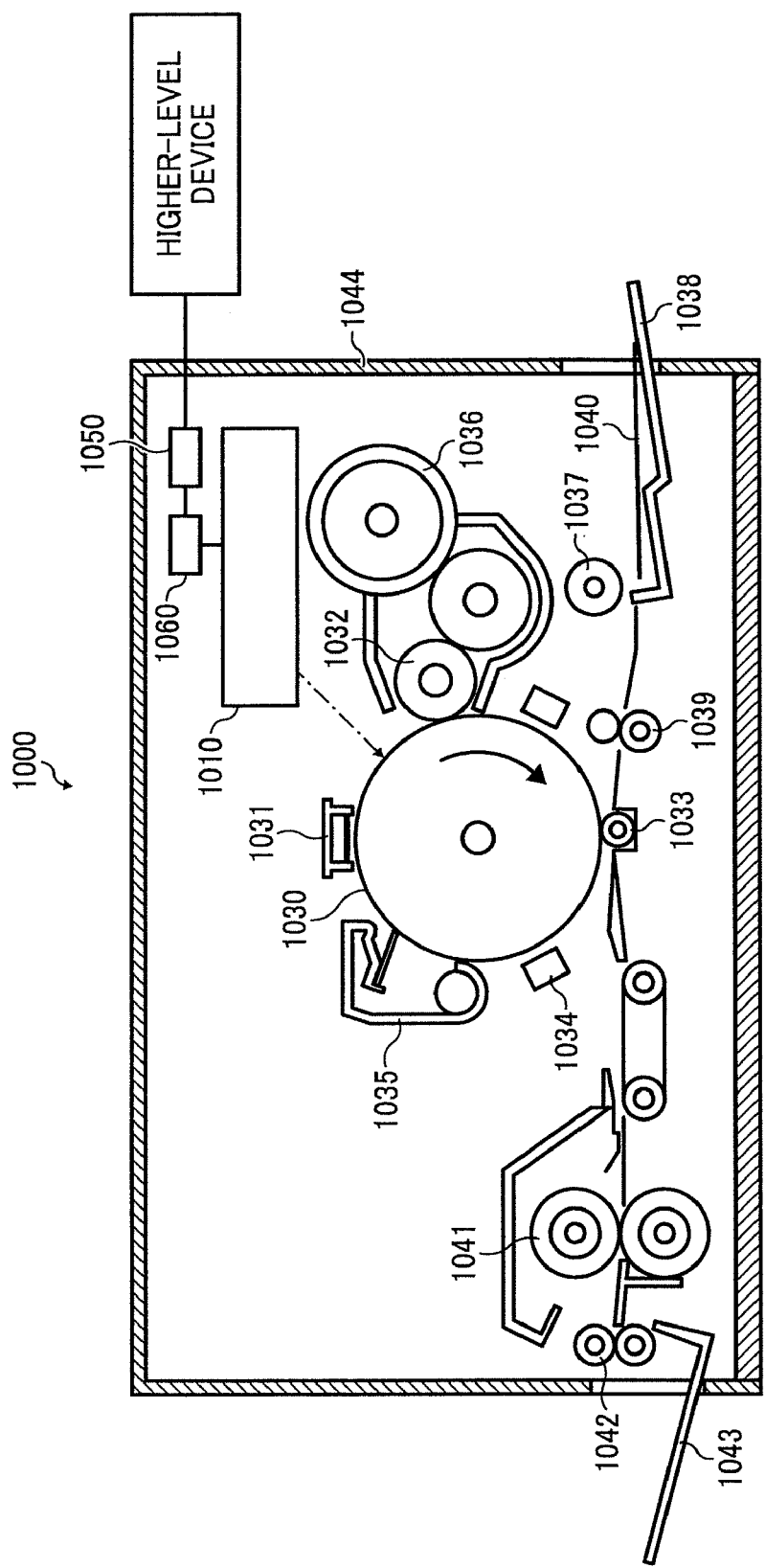
FIG. 1 is a diagram for explaining a schematic configuration of a laser printer according to one embodiment of the present invention.

One embodiment of the present invention is explained below with reference to FIG. 1 to FIG. 31. A schematic configuration of a laser printer 1000 as an example of an image forming apparatus according to the one embodiment is shown in FIG. 1.

The laser printer 1000 includes an optical scanning device 1010, a photosensitive drum 1030, a charging charger 1031, a developing roller 1032, a transfer charger 1033, a charge removing unit 1034, a cleaning unit 1035, a toner cartridge 1036, a paper feed roller 1037, a paper feed tray 1038, a registration roller pair 1039, a fixing unit 1041, a paper ejection roller 1042, a paper ejection tray 1043, a communication controller 1050, and a printer controller 1060 that integrally controls the components. These components are housed in a printer casing 1044 at their predetermined positions.

The communication controller 1050 controls bi-directional communications with a higher-level device (e.g., personal computer) through a network.

The photosensitive drum 1030 is a cylindrical member and has a photosensitive layer formed on its surface. This surface of the photosensitive drum 1030 is a surface that is to be scanned. The photosensitive drum 1030 is made to rotate in the direction of an arrow shown in FIG. 1.

The charging charger 1031, the developing roller 1032, the transfer charger 1033, the charge removing unit 1034, and the cleaning unit 1035 are arranged adjacent to and around the surface of the photosensitive drum 1030. These components are arranged along the rotation direction of the photosensitive drum 1030 in the following order: charging charger 1031→developing roller 1032→transfer charger 1033→charge removing unit 1034→cleaning unit 1035.

The charging charger 1031 uniformly electrically charges the surface of the photosensitive drum 1030.

The optical scanning device 1010 emits light flux modulated according to image information from the higher-level device to the charged surface of the photosensitive drum 1030. As a result, a latent image corresponding to the image information is formed on the surface of the photosensitive drum 1030. This latent image moves in the direction of the developing roller 1032 in association with the rotation of the photosensitive drum 1030. Detailed configuration of the optical scanning device 1010 will be explained later.

Toner is stored in the toner cartridge 1036. The toner is supplied to the developing roller 1032 when required.

The developing roller 1032 causes the toner supplied from the toner cartridge 1036 to adhere to the latent image formed on the surface of the photosensitive drum 1030. As a result, the latent image is visualized. The visualized latent image (hereinafter also called "toner image" for convenience) moves toward the transfer charger 1033 in association with the rotation of the photosensitive drum 1030.

One or more sheets of recording paper 1040 are stored in the paper feed tray 1038. The paper feed roller 1037 is arranged near the paper feed tray 1038, and the paper feed roller 1037 picks up the recording papers 1040 one sheet by one sheet from the paper feed tray 1038, and feeds it to the registration roller pair 1039. The registration roller pair 1039 once holds the recording paper 1040 fed by the paper feed roller 1037 and feeds the recording paper 1040 toward a space between the photosensitive drum 1030 and the transfer charger 1033 in synchronization with the rotation of the photosensitive drum 1030.

The transfer charger 1033 has a voltage of an opposite polarity to that of the toner. As a result, the toner on the surface of the photosensitive drum 1030 is electrically attracted toward the recording paper 1040. That is, the toner image on the surface of the photosensitive drum 1030 is transferred onto the recording paper 1040. The recording paper 1040 with the toner image transferred thereto is sent to the fixing unit 1041.

The fixing unit 1041 includes a roller pair that applies heat and pressure to the recording paper 1040. As a result, the toner is fixed on the recording paper 1040. The recording paper 1040 with the toner fixed thereon is sent to the paper ejection tray 1043 through the paper ejection roller 1042, and is sequentially stacked on the paper ejection tray 1043.

The charge removing unit 1034 removes the charge from the surface of the photosensitive drum 1030.

The cleaning unit 1035 removes the toner remaining on the surface of the photosensitive drum 1030 (residual toner). The surface of the photosensitive drum 1030 from which the residual toner has been removed returns again to the position opposed to the charging charger 1031.

Next, the configuration of the optical scanning device 1010 is explained below.

Figure 2:
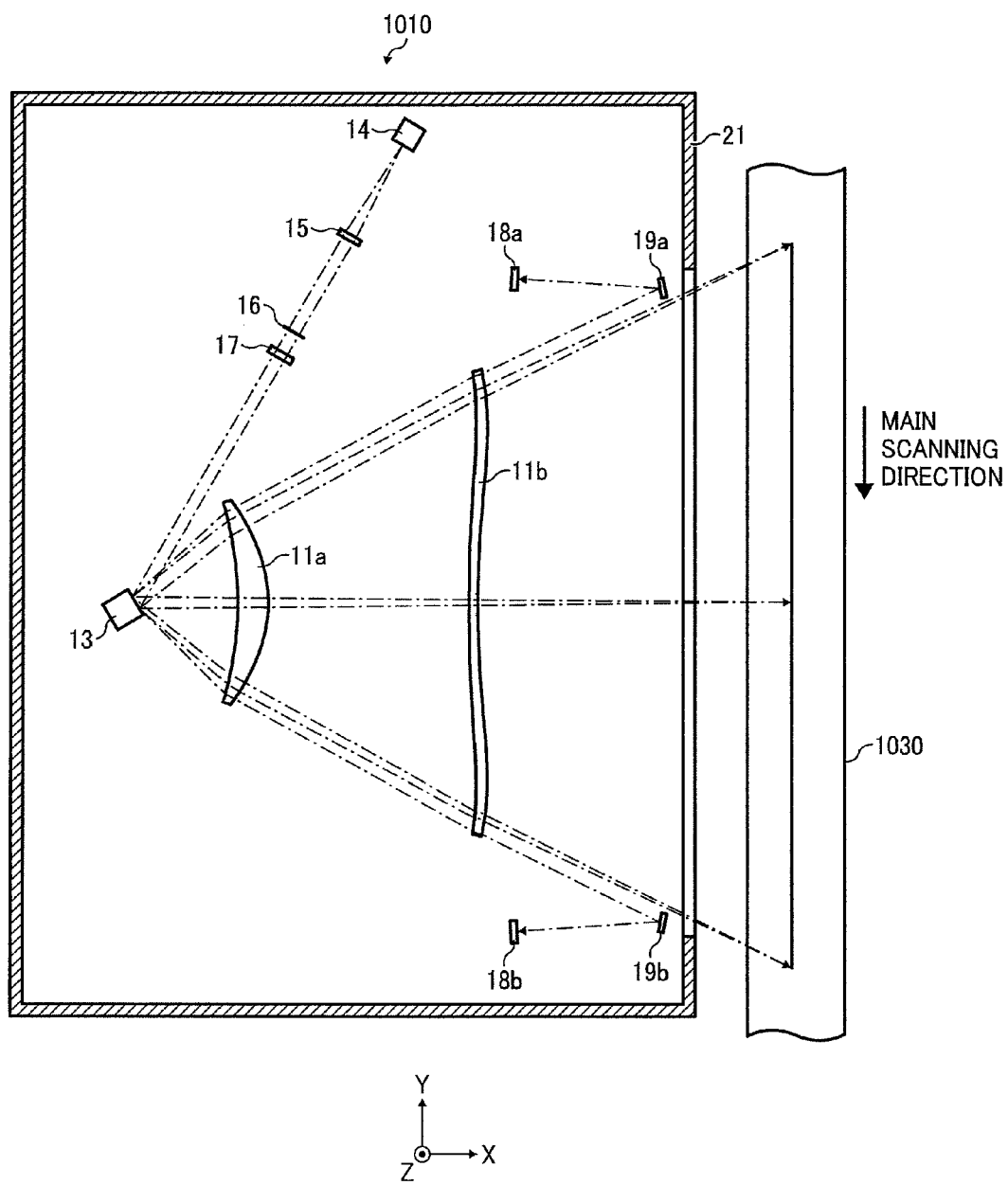
FIG. 2 is a schematic diagram of an optical scanning device in FIG. 1.
Figure 11:
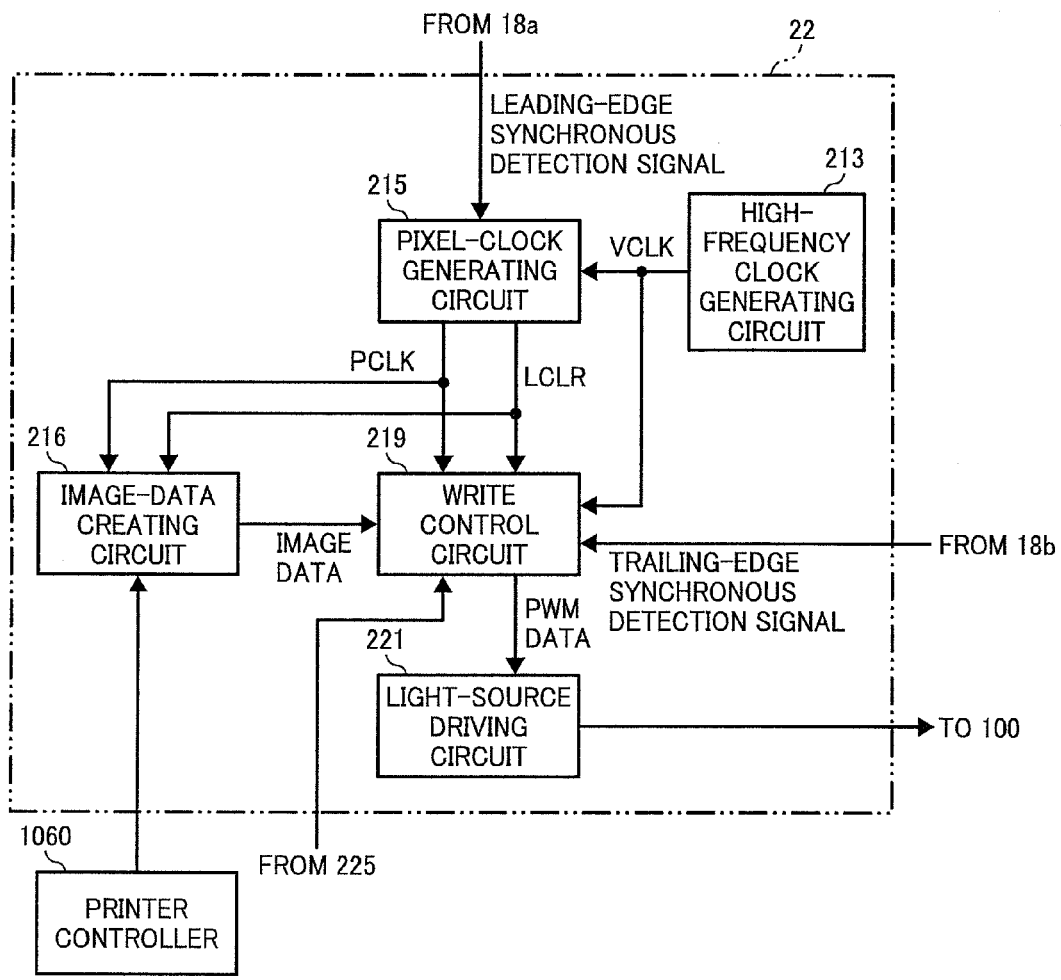
FIG. 11 is a block diagram for explaining a configuration of a scan control unit.

The optical scanning device 1010, as shown in FIG. 2, includes a light source 14, a coupling lens 15, an aperture plate 16, a cylindrical lens 17, a polygon mirror 13, an fθ lens 11a, a toroidal lens 11b, two photodetecting sensors (18a, 18b), two photodetecting mirrors (19a, 19b), and a scan control unit 22 (not shown in FIG. 2, see FIG. 11). At least one return mirror (not shown) is arranged on at least either one of a light path between the fθ lens 11a and the toroidal lens 11b and a light path between the toroidal lens 11b and the photosensitive drum 1030. These components are assembled into their predetermined positions within a housing 21.

An XYZ three-dimensional orthogonal coordinate system is assumed below in which a direction along a longitudinal direction of the photosensitive drum 1030 set as a Y-axis direction and a direction along the optical axis of the fθ lens 11a and the toroidal lens 11b set as an X-axis direction. In the following, the direction corresponding to the main scanning direction is briefly described as "main-scanning corresponding direction" and the direction corresponding to the sub-scanning direction is briefly described as "sub-scanning corresponding direction" for convenience.

Figure 3:
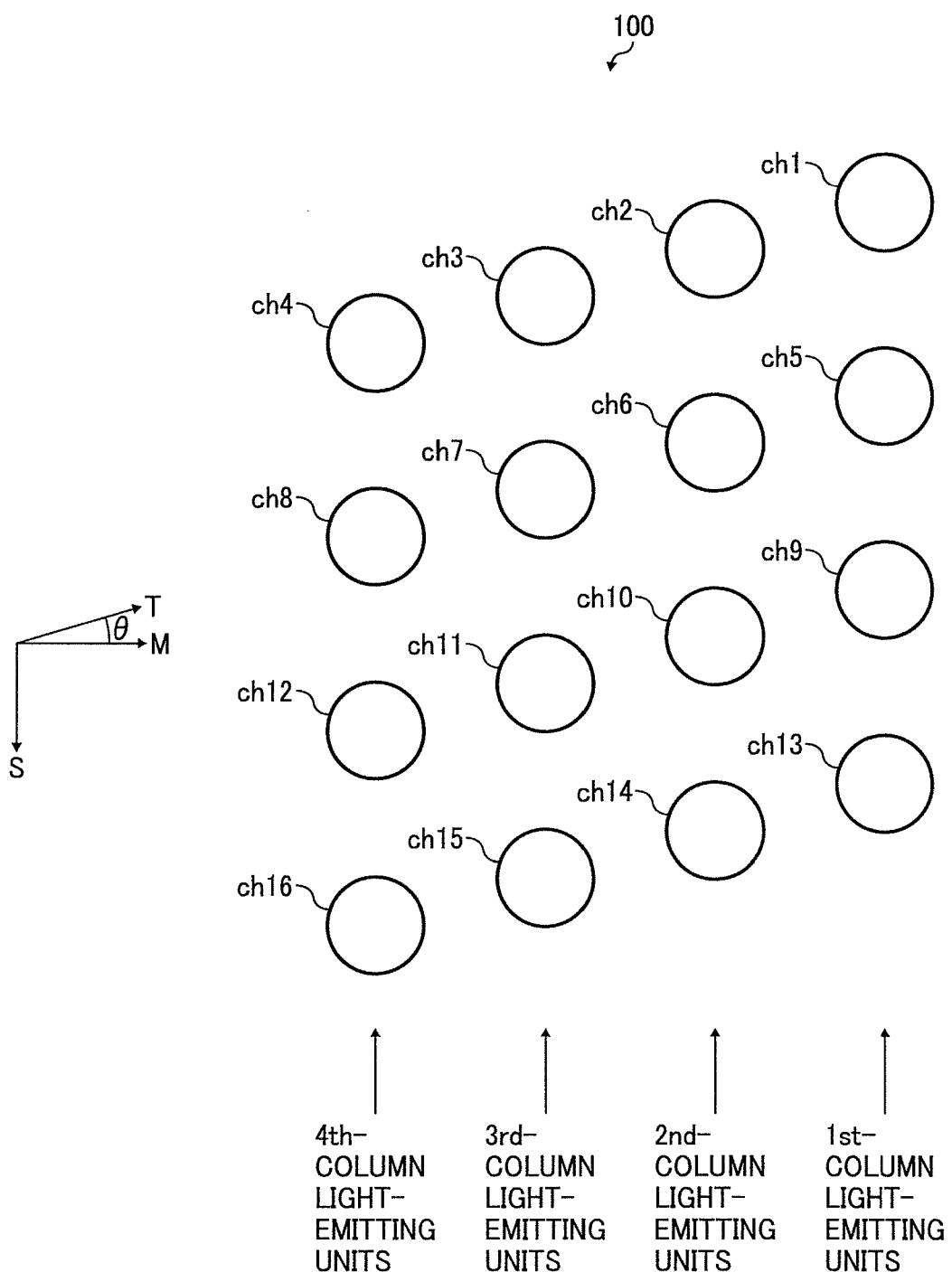
FIG. 3 is a diagram for explaining a surface-emitting laser array included in a light source in FIG. 2.

The light source 14, as shown in FIG. 3 as one example, includes a two-dimensional array 100 of 16 light-emitting units (ch1 to ch16) which are two-dimensionally arrayed on a single board. It should be noted that an M direction in FIG. 3 is the main-scanning corresponding direction and an S direction is the sub-scanning corresponding direction.

Light-emitting units ch1, ch5, ch9, and ch13 are also called 1st-column light-emitting units, light-emitting units ch2, ch6, ch10, and ch14: 2nd-column light-emitting units, light-emitting units ch3, ch7, ch11, and ch15: 3rd-column light-emitting units, and light-emitting units ch4, ch8, ch12, and ch16: 4th-column light-emitting units. The spaces between adjacent columns in the M direction are equal, and the space is 30 micrometers for example.

The 16 light-emitting units (ch1 to ch16) are arranged so that the spaces between adjacent light-emitting units are equal when all the light-emitting units are orthographically projected to a virtual line extending in the S direction. In the present specification, "space between light-emitting units" means a center-to-center distance of the two light-emitting units. By arranging the light-emitting units in this manner, the surface of the photosensitive drum 1030 can be simultaneously scanned with 16 light fluxes.

Each of the light-emitting units is a vertical cavity surface emitting laser (VCSEL) of which oscillation wavelength is 780-nanometer band. In other words, the two-dimensional array 100 is a so-called surface-emitting laser array.

Referring back to FIG. 2, the coupling lens 15 collimates the light flux emitted from the light source 14.

The aperture plate 16 has an aperture that defines a spot size of the light flux that has passed the coupling lens 15.

The cylindrical lens 17 focuses the light flux that has passed through the aperture of the aperture plate 16 as an image near a deflective-reflective surface of the polygon mirror 13 in a Z-axis direction.

An optical system arranged along the light path between the light source 14 and the polygon mirror 13 is also called a pre-deflector optical system. In the embodiment, the pre-deflector optical system is formed with the coupling lens 15, the aperture plate 16, and the cylindrical lens 17.

The polygon mirror 13 has four mirror surfaces, and each mirror surface is a deflective-reflective surface. The polygon mirror 13 rotates at a constant velocity around a shaft that is parallel to the Z-axis direction. Because of the rotation of the polygon mirror 13, the light flux that has passed the cylindrical lens 17 and fallen on the polygon mirror 13 is deflected.

The fθ lens 11a is arranged on a light path of the light flux deflected by the polygon mirror 13.

The toroidal lens 11b is arranged on a light path of the light flux through the fθ lens 11a.

The light flux that has sequentially passed through the fθ lens 11a, the toroidal lens 11b, and a bending mirror (not shown) irradiates the surface of the photosensitive drum 1030 in the form of a light spot. The light spot moves at a constant velocity in the Y-axis direction along the surface of the photosensitive drum 1030 in association with the rotation of the polygon mirror 13. That is, the surface of the photosensitive drum 1030 is scanned with the light spot. The movement direction of the light spot at this time is the "main scanning direction". Further, the rotation direction of the photosensitive drum 1030 is the "sub-scanning direction"

The optical system arranged along the light path between the polygon mirror 13 and the photosensitive drum 1030 is also called "scanning optical system". In the embodiment, the scanning optical system is formed with the fθ lens 11a, the toroidal lens 11b, and the return mirror (not shown).

Referring back to FIG. 2, a part of the light flux, before writing is started in one scan, of the entire light flux deflected by the polygon mirror 13 and that has passed through the scanning optical system enters the photodetecting sensor 18a after being reflected from the photodetecting mirror 19a. The photodetecting sensor 18a generates a signal, (hereinafter, "leading-edge synchronous detection signal") depending on the received amount of light to the scan control unit 22. More specifically, the photodetecting sensor 18a generates a logical high signal when the amount of light is equal to or less than a predetermined level, and generates a logical low signal when the amount of light exceeds the predetermined level.

Furthermore, a part of the light flux, after the writing is finished in one scan, of the entire light flux deflected by the polygon mirror 13 and that has passed through the scanning optical system, enters the photodetecting sensor 18b after being reflected from the photodetecting mirror 19b. The photodetecting sensor 18b generates a signal depending on the received amount of light and outputs the signal to the scan control unit 22. More specifically, the photodetecting sensor 18b generates a logical high signal (hereinafter, "trailing-edge synchronous detection signal") when the amount of light is equal to less than a predetermined level, and generates a logical low signal when the amount of light exceeds the predetermined level.

Incidentally, as an array of a plurality of light spots formed on the surface of the photosensitive drum 1030 when all the light-emitting units of the two-dimensional array 100 are simultaneously turned on, two arrays are conceivable dependent on a content of the configuration of the scanning optical system. In other words, an array the same as the array of the light-emitting units in the two-dimensional array 100 (hereinafter also called "array A" for convenience), and a vertically inverted array of the above array (hereinafter also called "array B" for convenience). Therefore, in the array A, +S direction in the two-dimensional array 100 corresponds to the "sub-scanning direction". In the array B, −S direction in the two-dimensional array 100 corresponds to the "sub-scanning direction".

The main scanning direction can have two directions: −Y direction and +Y direction.

Figures 4, 5:
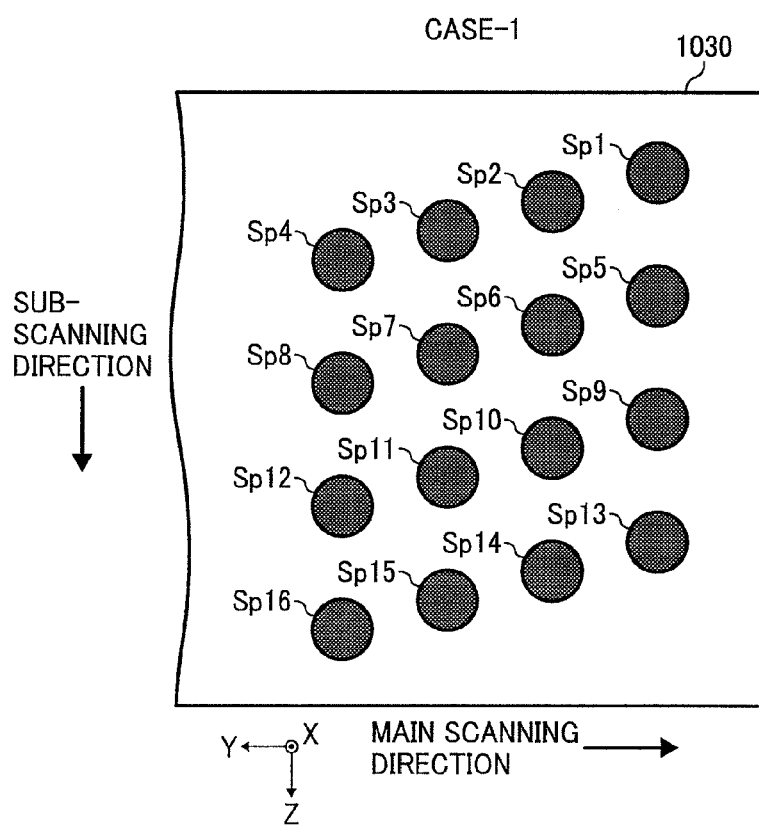
FIG. 4 is a table for explaining combinations of a main scanning direction and each array of a plurality of light spots.
FIG. 5 is a diagram for explaining CASE-1 in FIG. 4.

Therefore, as shown in FIG. 4, the following cases for writing to the photosensitive drum 1030 are conceivable:

(1) A case in which the main scanning direction is −Y direction and an array of the plurality of light spots is the array A (hereinafter also called "CASE-1" for convenience, see FIG. 5).

Figure 6:
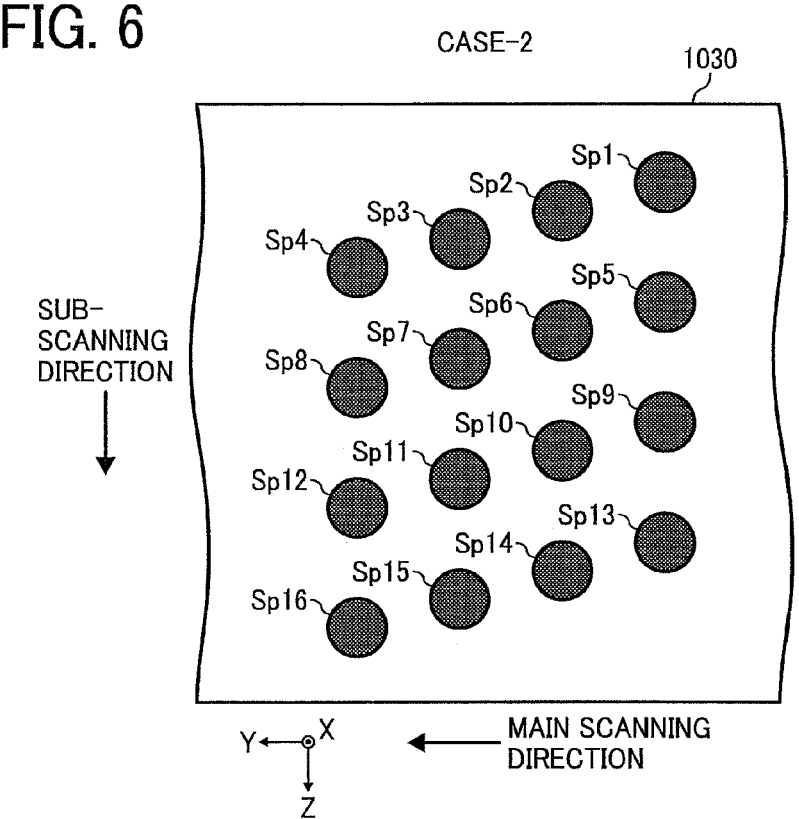
FIG. 6 is a diagram for explaining CASE-2 in FIG. 4.

(2) A case in which the main scanning direction is +Y direction and an array of the plurality of light spots is the array A (hereinafter also called "CASE-2" for convenience, see FIG. 6).

Figure 7:
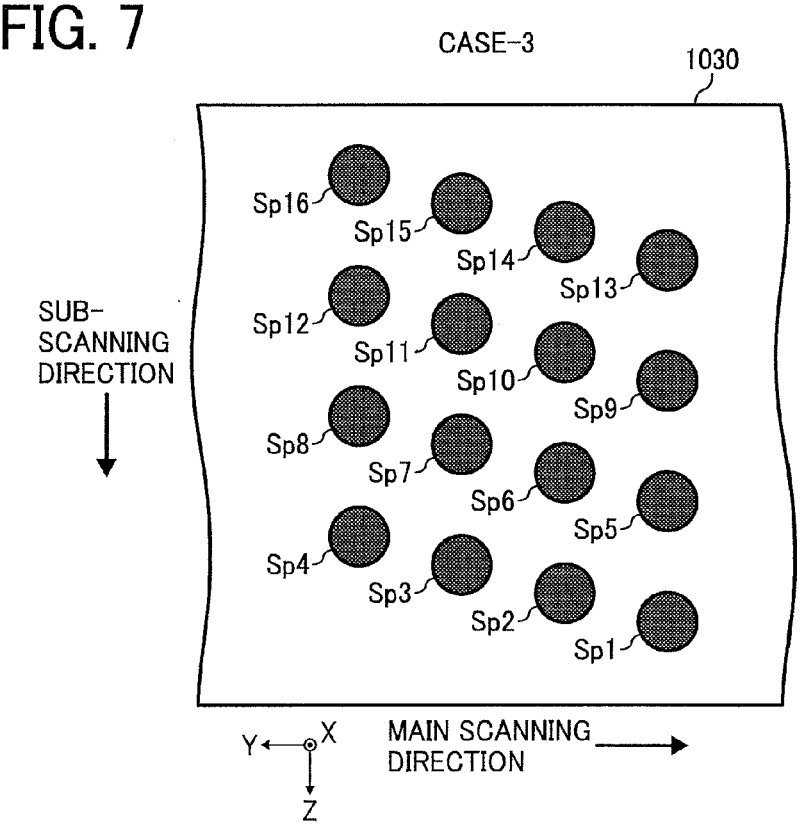
FIG. 7 is a diagram for explaining CASE-3 in FIG. 4.

(3) A case in which the main scanning direction is −Y direction and an array of the plurality of light spots is the array B (hereinafter also called "CASE-3" for convenience, see FIG. 7).

(4) A case in which the main scanning direction is +Y direction and an array of the plurality of light spots is the array B (hereinafter also called "CASE-4" for convenience, see FIG. 8).

Reference signs Sp1 to Sp16 in FIG. 5 to FIG. 8 represent light spots corresponding to the light-emitting units ch1 to ch16, respectively.

Which of the CASE-1 to the CASE-4 the optical scanning device 1010 corresponds to is set by a worker, as shown in FIG. 9 as one example, using sw1 and sw2 of a DIP switch 225 upon manufacture, upon adjustment, or upon shipping thereof. It should be noted that a signal Ssw1 including a state of the sw1 and a signal Ssw2 including a state of the sw2 are output from the DIP switch 225.

As shown in FIG. 10, in the case of CASE-1, setting is such that Ssw1="L" (low logical level) and Ssw2="L", in the case of CASE-2, Ssw1="H" (high logical level) and Ssw2="H", in the case of CASE-3, Ssw1="H" and Ssw2="L", and in the case of CASE-4, Ssw1="L" and Ssw2="H".

An exemplary configuration of the scan control unit 22 is shown in FIG. 11. In this example, the scan control unit 22 includes a high-frequency clock generating circuit 213, a pixel-clock generating circuit 215, an image-data creating circuit 216, a write control circuit 219, and a light-source driving circuit 221. The arrows shown in FIG. 11 represent flows of signals and information. That is, the arrows do not represent the whole of the relation of connection between blocks.

Figure 12:
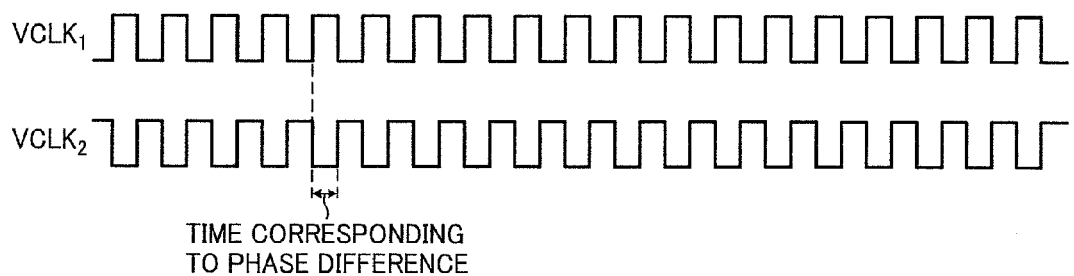
FIG. 12 is a waveform diagram for explaining two high-frequency clock signals having mutually different phases.

The high-frequency clock generating circuit 213 generates a plurality of high-frequency clock signals having mutually different phases. Examples of signals generated by the high-frequency clock generating circuit 213 are shown in FIG. 12. In this example, the high-frequency clock generating circuit 213 generates two high-frequency clock signals ($VCLK_1$ and $VCLK_2$) whose phases are different from each other by 180 degrees. Therefore, the time corresponding to the phase difference between the high-frequency clock signal $VCLK_1$ and the high-frequency clock signal $VCLK_2$ is a one-half period of the high-frequency clock signal. The high-frequency clock signals generated here are supplied to the pixel-clock generating circuit 215 and the write control circuit 219. It should be noted that if there is no need to discriminate the two high-frequency clock signals from each other, they are collectively called "high-frequency clock signal VCLK". In the following description, the time corresponding to the phase difference between the high-frequency clock signal $VCLK_1$ and the high-frequency clock signal $VCLK_2$ is also briefly called "phase-difference corresponding time" for convenience.

Figure 13:
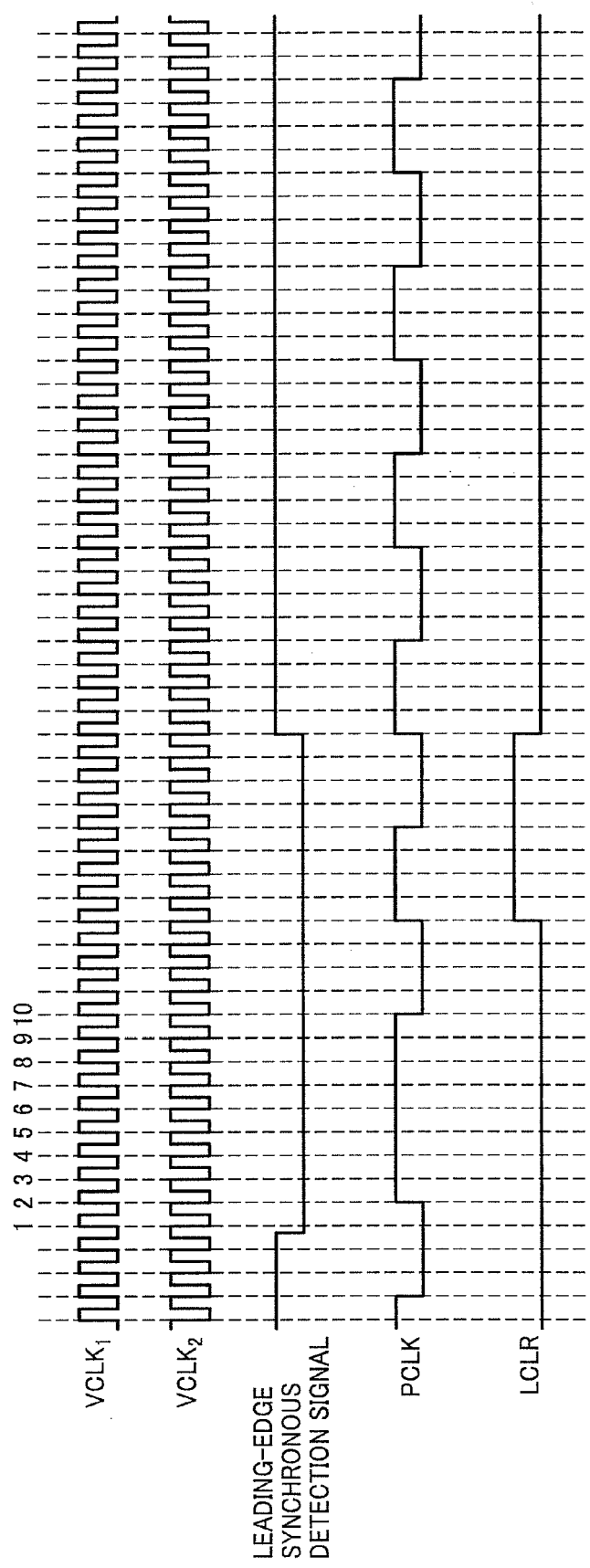
FIG. 13 is a timing chart for explaining operations of a pixel-clock generating circuit.

The pixel-clock generating circuit 215 generates a pixel clock signal PCLK set as output reference of pixel (dot) data based on the high-frequency clock signal $VCLK_1$ from the high-frequency clock generating circuit 213. Here, as shown in FIG. 13 as one example, the pixel clock signal PCLK is set as a clock signal equivalent to 8 frequency division of the high-frequency clock signal $VCLK_1$. The pixel-clock generating circuit 215 also generates a line clear signal LCLR. The pixel clock signal PCLK and the line clear signal LCLR generated here are synchronized with the leading-edge synchronous detection signal to be supplied to the image-data creating circuit 216 and the write control circuit 219.

More specifically, as shown in FIG. 13, the pixel-clock generating circuit 215 outputs the pixel clock signal PCLK in synchronization with a 10-th clock rising timing of the high-frequency clock signal $VCLK_1$ by setting, as a base point (1st clock), a rising timing of the high-frequency clock signal $VCLK_1$ right after the leading-edge synchronous detection signal changes from high logical level to low logical level. Furthermore, the pixel-clock generating circuit 215 changes the line clear signal LCLR from low logical level to high logical level at an initial rising timing of the synchronized pixel clock signal PCLK, and changes the line clear signal LCLR from high logical level to low logical level at a next rising timing of the pixel clock signal PCLK.

Figure 14:
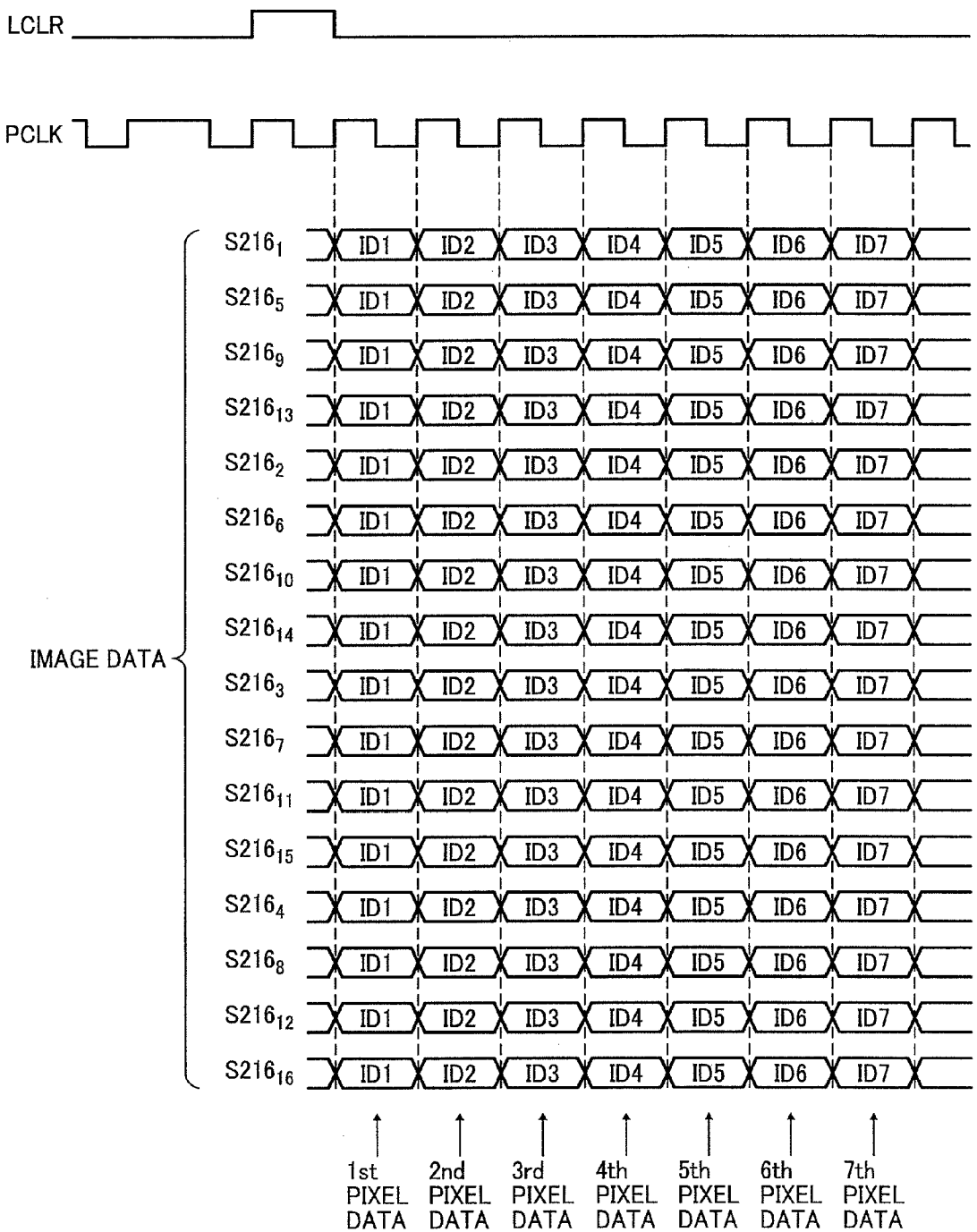
FIG. 14 is a timing chart for explaining operations of an image-data creating circuit.

Referring back to FIG. 11, the image-data creating circuit 216 performs raster development on the image information received from the higher-level device through the printer controller 1060 and also performs a predetermined halftone process thereon, and then creates image data representing gradation of each pixel in each light-emitting unit based on the pixel clock signal PCLK. As shown in FIG. 14 as one example, when detecting the change from low logical level to high logical level of the line clear signal LCLR, the image-data creating circuit 216 synchronizes the rising timing of the pixel clock signal PCLK, to output image data ($S216_1$ to $S216_{16}$) in the order from first pixel data (ID1) to the write control circuit 219. Here, 1 pixel data is 4-bit data. Moreover, the image data $S216_1$ is image data corresponding to a 1st scan line, the image data $S216_2$ is image data corresponding to a 2nd scan line, . . . , and the image data $S216_{16}$ is image data corresponding to a 16th scan line.

Figure 15:
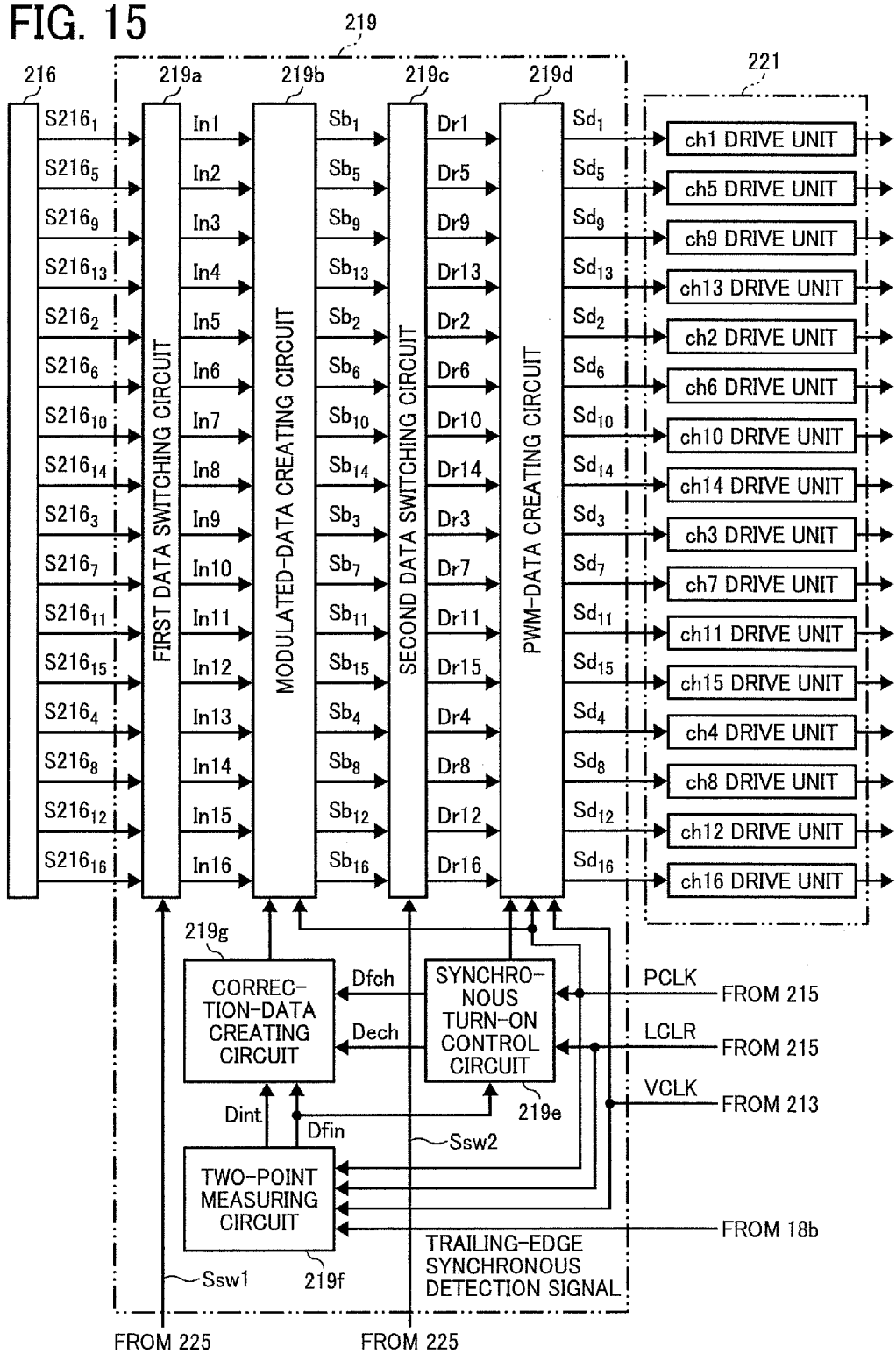
FIG. 15 is a diagram for explaining a configuration of a write control circuit.

The write control circuit 219, as shown in FIG. 15 as one example, includes a first data switching circuit 219a, a modulated-data creating circuit 219b, a second data switching circuit 219c, a PWM-data creating circuit 219d, a synchronous turn-on control circuit 219e, a two-point measuring circuit 219f, and a correction-data creating circuit 219g.

The first data switching circuit 219a receives the image data ($S216_1$ to $S216_{16}$) from the image-data creating circuit 216. Then the first data switching circuit 219a determines a correspondence relation between the image data ($S216_1$ to $S216_{16}$) and input signals (In1 to In16) of the modulated-data creating circuit 219b, based on the set content (Ssw1) of the sw1 in the DIP switch 225.

The results of determination in the first data switching circuit 219a are shown in FIG. 16.

The two-point measuring circuit 219f has two counters (a first counter and a second counter), and measures a time interval between the rising timing of the leading-edge synchronous detection signal and the rising timing of the trailing-edge synchronous detection signal, and outputs measured data Dint to the correction-data creating circuit 219g. The two-point measuring circuit 219f also outputs a measurement finish signal Dfin for notifying the finish of measurement to the synchronous turn-on control circuit 219e and the correction-data creating circuit 219g.

Figure 17:
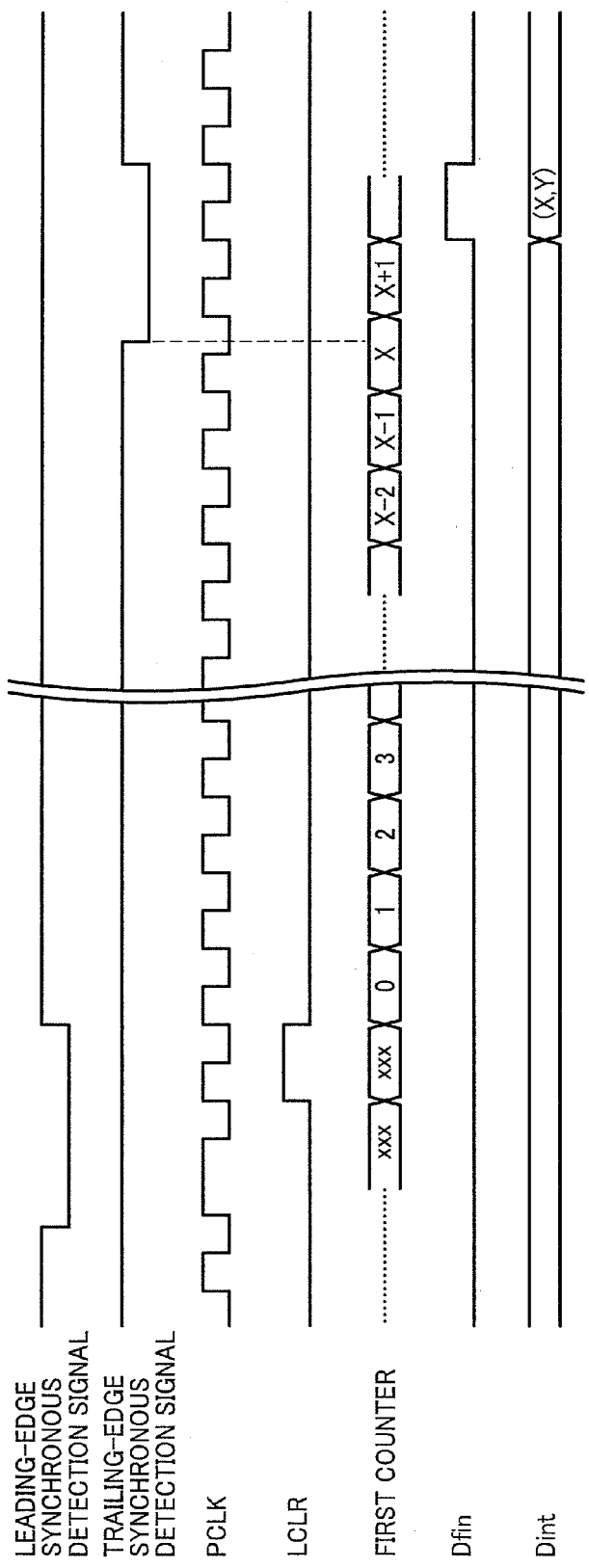
FIG. 17 is a timing chart (part 1) for explaining operations of a two-point measuring circuit.
Figure 18:
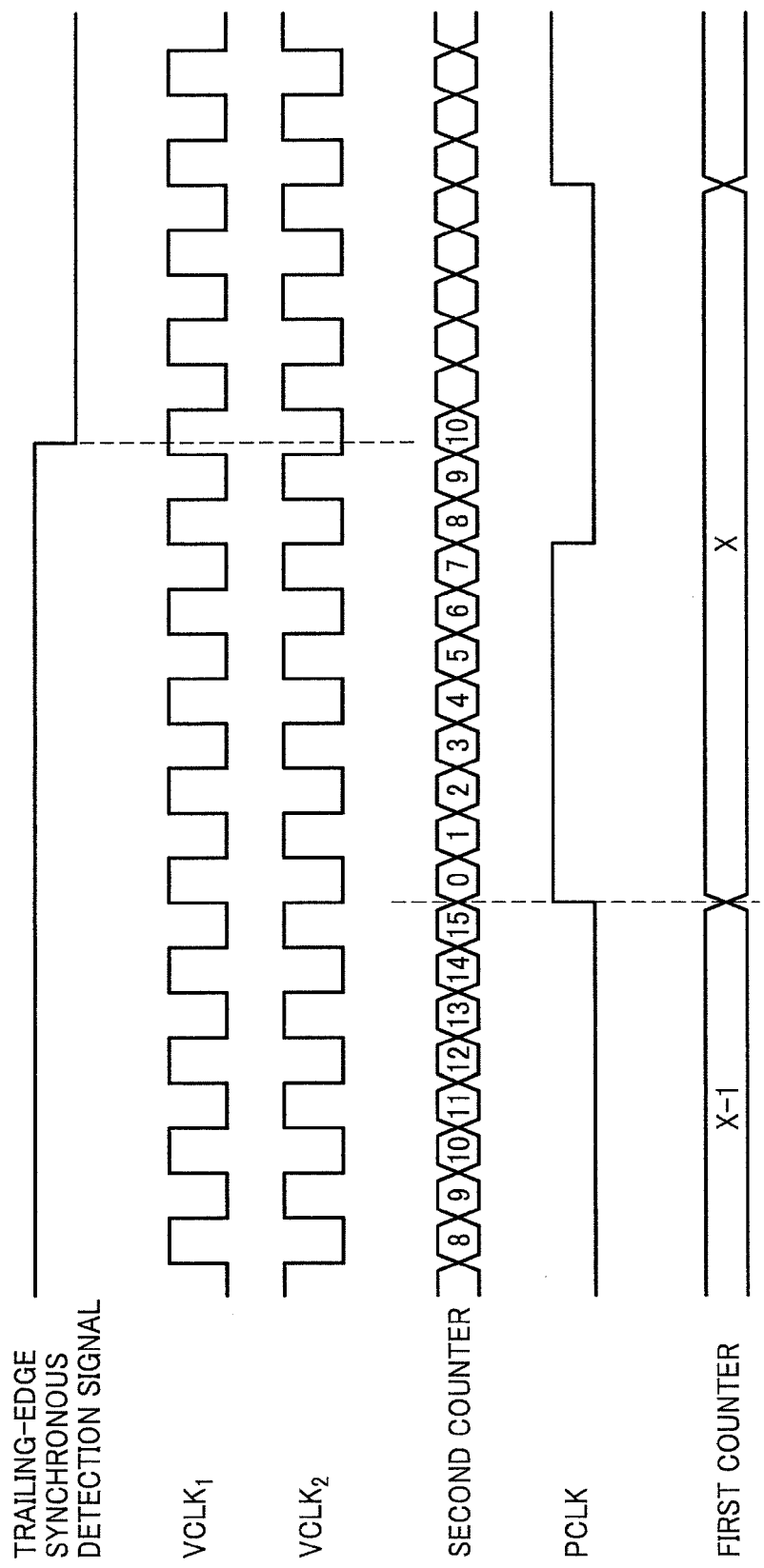
FIG. 18 is a timing chart (part 2) for explaining operations of the two-point measuring circuit.

The operations of the two-point measuring circuit 219f are explained below using timing charts in FIG. 17 and FIG. 18. FIG. 18 is a detailed timing chart around a time point at which the trailing-edge synchronous detection signal changes from high logical level to low logical level.

(1-1) When the line clear signal LCLR changes from low logical level to high logical level, a value of the first counter and a value of the second counter are reset to "0" at a next rising timing of the pixel clock signal PCLK. The value of the first counter is counted up in synchronization with the rising timing of the pixel clock signal PCLK. Meanwhile, the value of the second counter is counted up in synchronization with the rising timings of the high-frequency clock signal $VCLK_1$ and the high-frequency clock signal $VCLK_2$ (see FIG. 18).

(1-2) When the trailing-edge synchronous detection signal changes from high logical level to low logical level, a value of the first counter and a value of the second counter at this time are determined. In FIG. 18, the value of the first counter is "X" and the value of the second counter is "10".

(1-3) The value of the first counter and the value of the second counter are output as measured data Dint to the correction-data creating circuit 219g. Furthermore, the measured data Dint is output, and at the same time, the measurement finish signal Dfin is changed from low logical level to high logical level. In the following, when the content of the measured data Dint is to be shown, the form of "the value of the first counter and the value of the second counter" is used to represent the content.

(1-4) The measurement finish signal Dfin is changed from high logical level to low logical level in synchronization with the next rising timing of the pixel clock signal PCLK.

Referring back to FIG. 15, the synchronous turn-on control circuit 219e selects a light-emitting unit that emits light detected by the photodetecting sensor 18a (hereinafter also called "leading-edge synchronous light-emitting unit" for convenience) and a light-emitting unit that emits light detected by the photodetecting sensor 18b (hereinafter also called "trailing-edge synchronous light-emitting unit" for convenience), and generates a plurality of synchronous turn-on signals (ch1 synchronous turn-on signal to ch16 synchronous turn-on signal) in order to turn on the selected light-emitting units. The plurality of synchronous turn-on signals generated here is output to the PWM-data creating circuit 219d. It should be noted that the ch1 synchronous turn-on signal corresponds to a light-emitting unit ch1, the ch2 synchronous turn-on signal corresponds to a light-emitting unit ch2, . . . , and the ch16 synchronous turn-on signal corresponds to a light-emitting unit ch16.

Moreover, the synchronous turn-on control circuit 219e notifies the correction-data creating circuit 219g of leading-edge ch information Dfch for specifying the leading-edge synchronous light-emitting unit and of trailing-edge ch information Dech for specifying the trailing-edge synchronous light-emitting unit.

Figure 19:
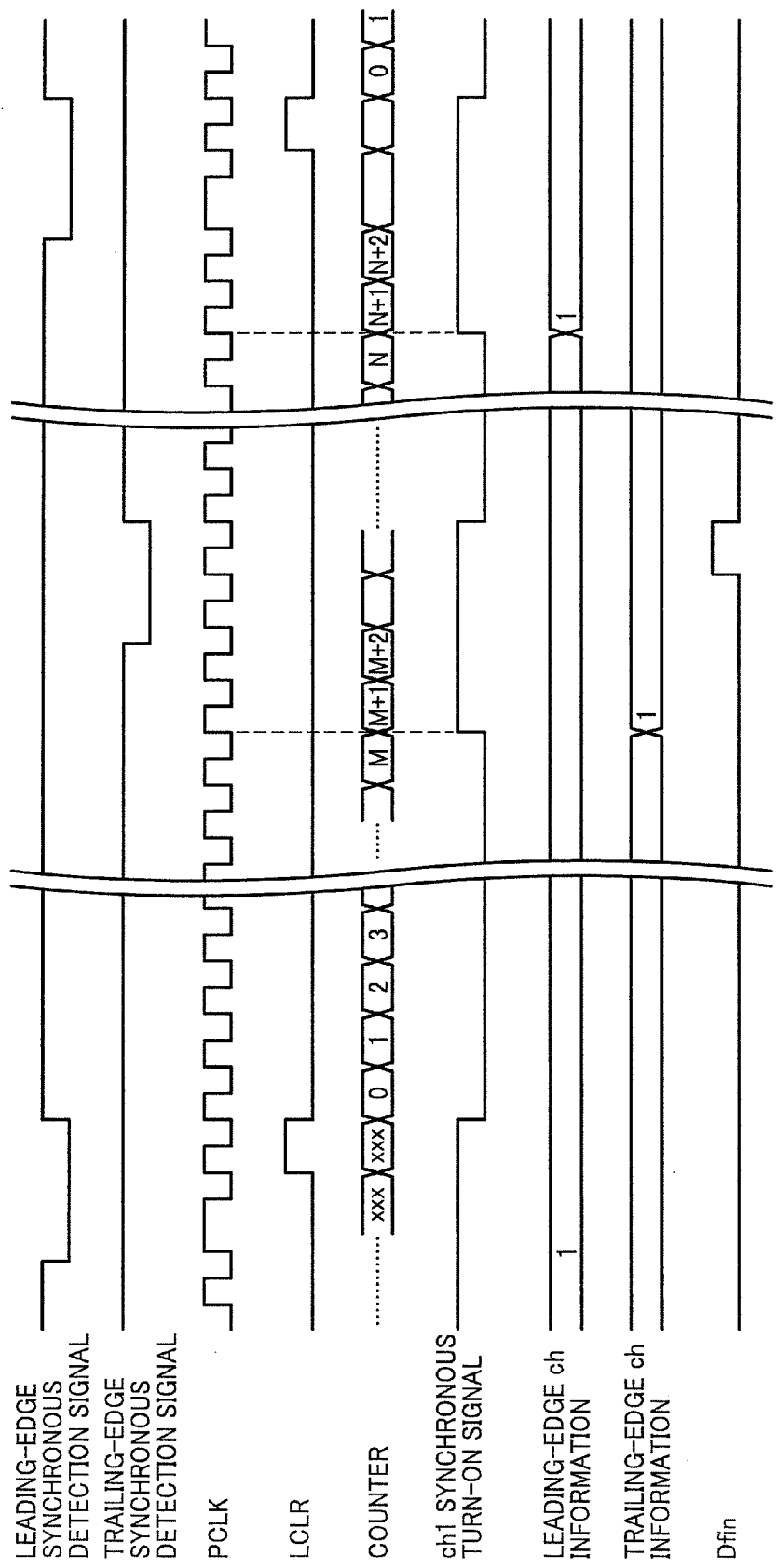
FIG. 19 is a timing chart (part 1) for explaining operations of a synchronous turn-on control circuit.

The operations of the synchronous turn-on control circuit 219e are explained below using a timing chart of FIG. 19. Here, as one example, both the leading-edge synchronous light-emitting unit and the trailing-edge synchronous light-emitting unit are assumed as the light-emitting unit ch1.

(2-1) When the line clear signal LCLR changes from low logical level to high logical level, a value of an internally provided counter is reset to "0" in synchronization with the next rising timing of the pixel clock signal PCLK. The value of the counter is counted up in synchronization with the rising timing of the pixel clock signal PCLK.

(2-2) When the value of the counter becomes a value (assumed as M) corresponding to a turn-on timing for preset trailing-edge synchronous detection, the ch1 synchronous turn-on signal is changed from low logical level to high logical level. This causes the light-emitting unit ch1 to be turned on. At the same time, "1" is notified as the trailing-edge ch information Dech. All the ch2 synchronous turn-on signal to the ch16 synchronous turn-on signal remain as low logical level.

(2-3) When the measurement finish signal Dfin from the two-point measuring circuit 219f changes from low logical level to high logical level, the ch1 synchronous turn-on signal is changed from high logical level to low logical level at the next rising timing of the pixel clock signal PCLK. This causes the light-emitting unit ch1 to be turned off.

(2-4) When the value of the counter becomes a value (assumed as N) corresponding to a turn-on timing for preset leading-edge synchronous detection, the ch1 synchronous turn-on signal is changed from low logical level to high logical level. This causes the light-emitting unit ch1 to be turned on. At the same time, "1" is notified as leading-edge ch information Dfch. All the ch2 synchronous turn-on signal to the ch16 synchronous turn-on signal remain as low logical level.

(2-5) When the line clear signal LCLR changes from low logical level to high logical level, the value of the counter is reset to "0" and the ch1 synchronous turn-on signal is changed from high logical level to low logical level in synchronization with the next rising timing of the pixel clock signal PCLK. This causes the light-emitting unit ch1 to be turned off.

Figure 20:
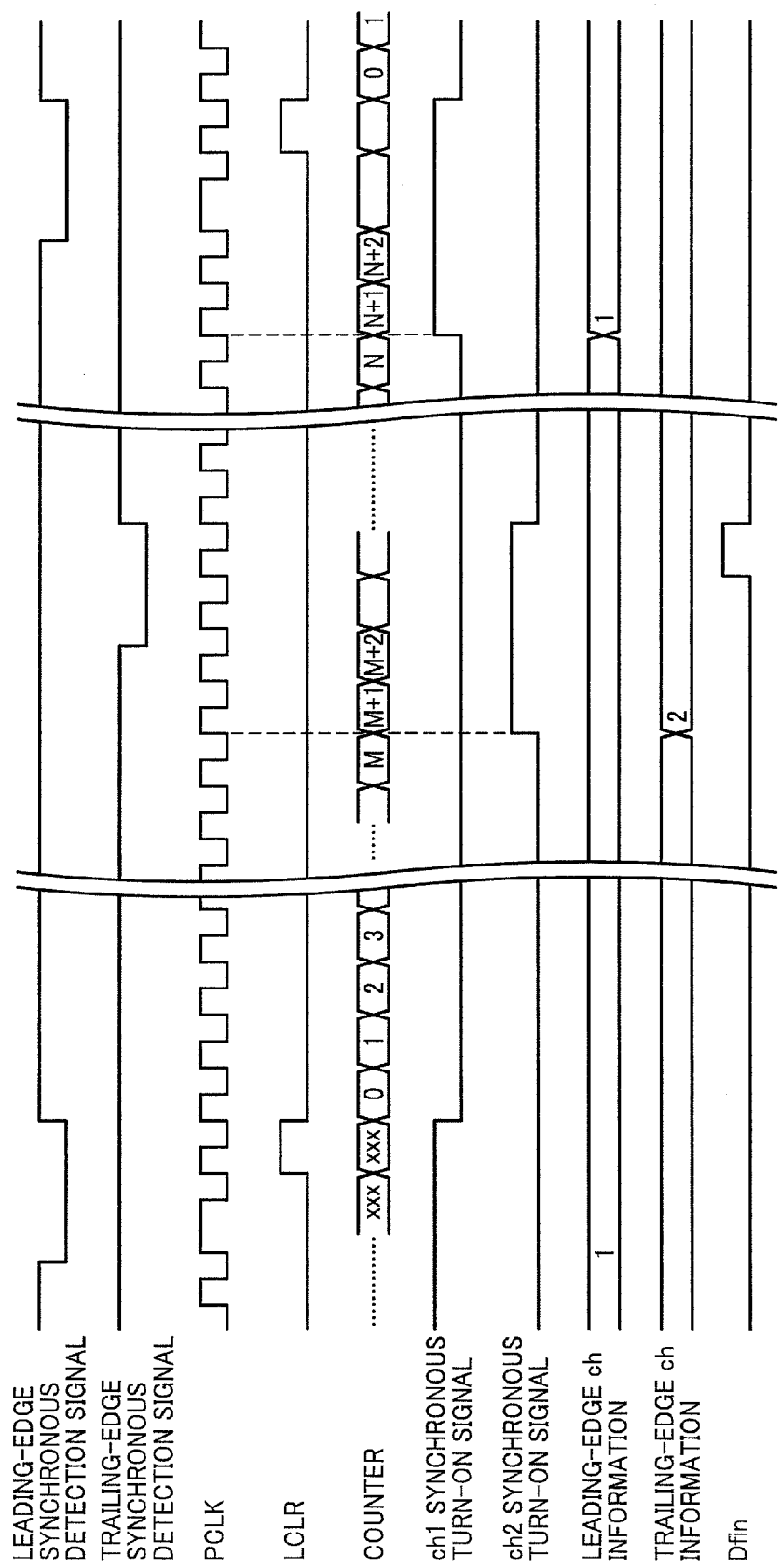
FIG. 20 is a timing chart (part 2) for explaining operations of the synchronous turn-on control circuit.

It should be noted that the leading-edge synchronous light-emitting unit and the trailing-edge synchronous light-emitting unit may be mutually different light-emitting units. For example, FIG. 20 represents a timing chart in a case in which the light-emitting unit ch1 is the leading-edge synchronous light-emitting unit and the light-emitting unit ch2 is the trailing-edge synchronous light-emitting unit. In this case, in the (2-2) and (2-3), the signal level of the ch2 synchronous turn-on signal is changed instead of the ch1 synchronous turn-on signal.

Referring back to FIG. 15, the correction-data creating circuit 219g separately creates correction data in each light-emitting unit based on the measured data Dint, the measurement finish signal Dfin, the leading-edge ch information Dfch, and the trailing-edge ch information Dech.

Figure 21:
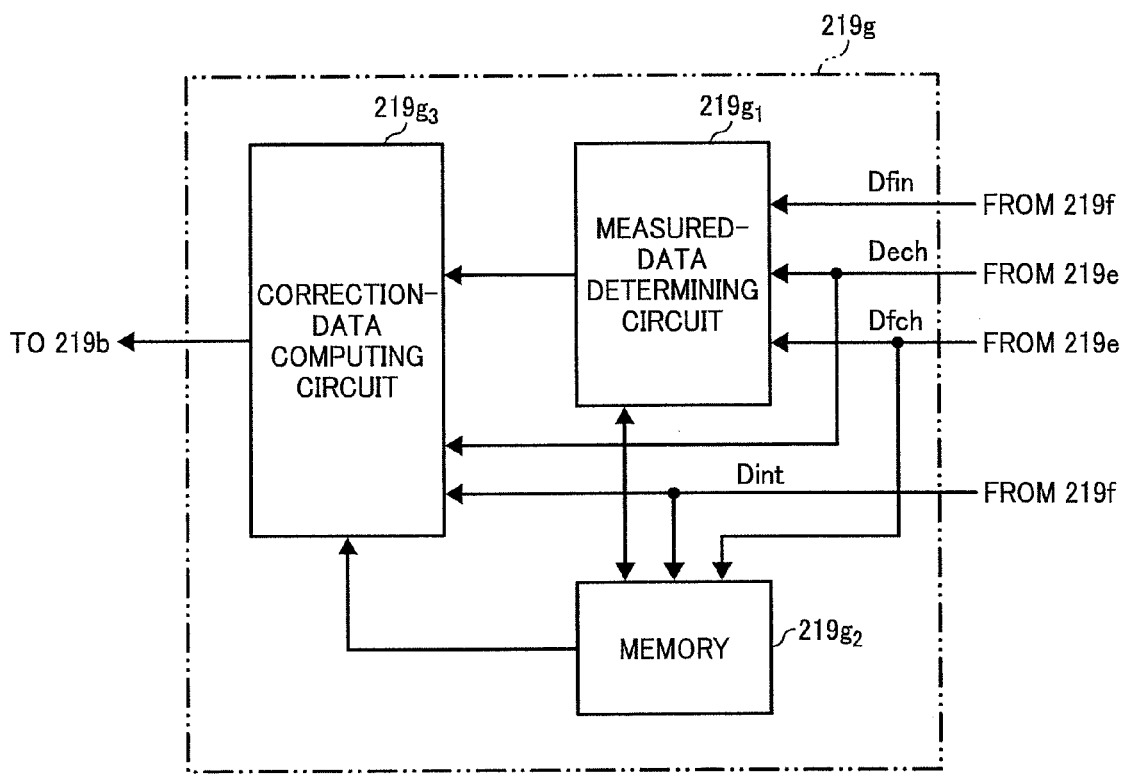
FIG. 21 is a diagram for explaining a configuration of a correction-data creating circuit.

The correction-data creating circuit 219g, as shown in FIG. 21, includes a measured-data determining circuit $219g_1$, a memory $219g_2$, and a correction-data computing circuit $219g_3$.

The measured-data determining circuit $219g_1$ detects the finish of measurement from the measurement finish signal Dfin, and determines whether the light-emitting unit specified from the leading-edge ch information Dfch and the light-emitting unit specified from the trailing-edge ch information Dech are the same light-emitting unit. If the light-emitting unit specified from the leading-edge ch information Dfch and the light-emitting unit specified from the trailing-edge ch information Dech are the same as each other, the measured-data determining circuit $219g_1$ stores input measured data Dint as "reference data" in the memory $219g_2$. The leading-edge ch information Dfch at this time is also stored as "reference light-emitting unit data" in the memory $219g_2$. Meanwhile, if the light-emitting unit specified from the leading-edge ch information Dfch and the light-emitting unit specified from the trailing-edge ch information Dech are different from each other, the measured-data determining circuit $219g_1$ determines whether the light-emitting unit specified from the leading-edge ch information Dfch and the light-emitting unit specified from the "reference light-emitting unit data" stored in the memory $219g_2$ are the same as each other. If the light-emitting unit specified from the leading-edge ch information Dfch and the light-emitting unit specified from the "reference light-emitting unit data" are the same as each other, the measured-data determining circuit $219g_1$ instructs the correction-data computing circuit $219g_3$ to compute correction data. Meanwhile, if the light-emitting unit specified from the leading-edge ch information Dfch and the light-emitting unit specified from the "reference light-emitting unit data" are different from each other, the measured-data determining circuit $219g_1$ does nothing.

The correction-data computing circuit $219g_3$ determines a difference between the "reference data" stored in the memory $219g_2$ and the measured data Dint at that time as correction data Dmod in the light-emitting unit specified from the trailing-edge ch information Dech, based on the instruction of the measured-data determining circuit $219g_1$. For example, if the reference data stored in the memory $219g_2$ is (X1, Y1) and the measured data Dint at that time is (X2, Y2), then the correction-data computing circuit $219g_3$ determines the correction data Dmod from the following Equation (1). The reason why "16" is used in Equation (1) is that, one period of a pixel clock signal (hereinafter also called "one pixel clock") is equivalent to 16 units of one-half a period of a high-frequency clock signal (hereinafter also called "one-half of the high-frequency clock").

$$Dmon=(X1\times16+Y1)-(X2\times16+Y2) \qquad (1)$$

Therefore, for example, if the correction data Dmod obtained from Equation (1) is expressed by an 11-bit binary number, lower-order 4 bits (bit 3 to bit 0) are set as a value using the one-half of the high-frequency clock as a unit, and higher-order 7 bits (bit 10 to bit 4) are set as a value using one pixel clock as a unit.

Figure 22:
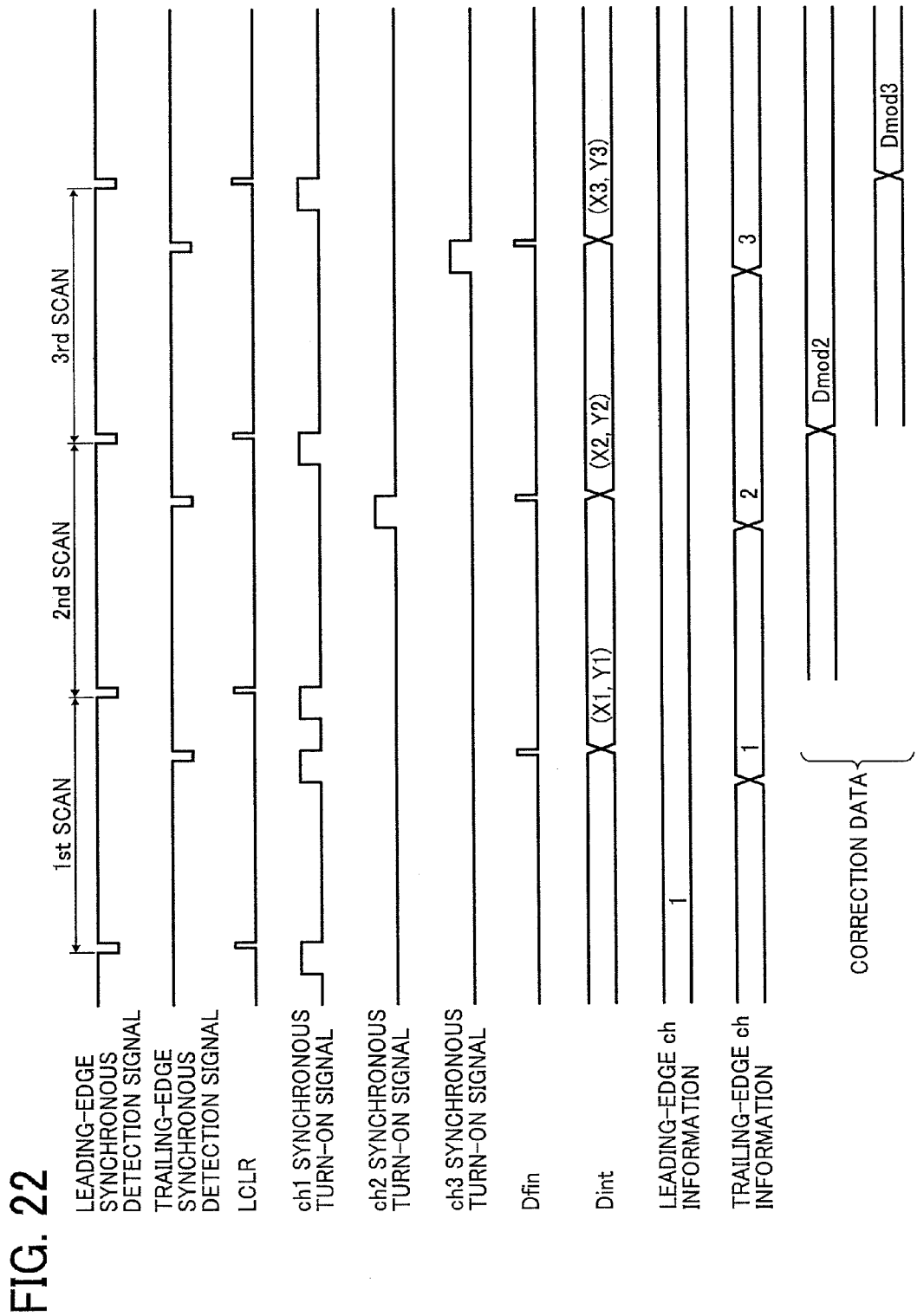
FIG. 22 is a timing chart for explaining operations of the correction-data creating circuit.

Specific operations of the correction-data creating circuit 219g are explained below using a timing chart in FIG. 22. Here, it is assumed that the leading-edge synchronous light-emitting unit is the light-emitting unit ch1 in any of 1st scan to 16th scan, while the trailing-edge synchronous light-emitting unit is the light-emitting unit ch1 in the 1st scan, the light-emitting unit ch2 in the 2nd scan, the light-emitting unit ch3 in the 3rd scan, . . . , and the light-emitting unit ch16 in the 16th scan. It should be noted that up to the 3rd scan is shown in FIG. 22 due to space limitations.

(3-1) At the 1st scan, when detecting the finish of measurement from the measurement finish signal Dfin, the correction-data creating circuit 219g compares the light-emitting unit specified from the leading-edge ch information Dfch with the light-emitting unit specified from the trailing-edge ch information Dech. Here, both the light-emitting unit specified from the leading-edge ch information Dfch and the light-emitting unit specified from the trailing-edge ch information Dech are the light-emitting unit ch1, and, therefore, input measured data (here, set as (X1, Y1)) is stored as the "reference data".

(3-2) At the 2nd scan, when detecting the finish of measurement from the measurement finish signal Dfin, the correction-data creating circuit 219g compares the light-emitting unit specified from the leading-edge ch information Dfch with the light-emitting unit specified from the trailing-edge ch information Dech. Here, the light-emitting unit specified from the leading-edge ch information Dfch is the light-emitting unit ch1, and the light-emitting unit specified from the trailing-edge ch information Dech is the light-emitting unit ch2, and, therefore, a difference between the "reference data" (X1, Y1) and input measured data (here, set as (X2, Y2)) is determined, and the difference is output as the correction data Dmod2 of the light-emitting unit ch2.

(3-3) At the 3rd scan, when detecting the finish of measurement from the measurement finish signal Dfin, the correction-data creating circuit 219g compares the light-emitting unit specified from the leading-edge ch information Dfch with the light-emitting unit specified from the trailing-edge ch information Dech. Here, the light-emitting unit specified from the leading-edge ch information Dfch is the light-emitting unit ch1, and the light-emitting unit specified from the trailing-edge ch information Dech is the light-emitting unit ch3, and, therefore, a difference between the "reference data" (X1, Y1) and input measured data (here, set as (X3, Y3)) is determined, and the difference is output as the correction data Dmod3 of the light-emitting unit ch3.

Hereinafter, at 4th scan to 16th scan, when detecting the finish of measurement from the measurement finish signal Dfin, the correction-data creating circuit 219g outputs correction data (Dmod4 to Dmod16) of the light-emitting unit ch4 to the light-emitting unit ch16 in the same manner as above.

The correction data is acquired before actual writing, and the acquired correction data is used to perform writing thereafter. Furthermore, it is also possible to arbitrarily acquire correction data in a manner other than that.

Referring back to FIG. 15, the modulated-data creating circuit 219b converts output signals (In1 to In16) of the first data switching circuit 219a to modulated data ($Sb_1$ to $Sb_{16}$), respectively. The modulated-data creating circuit 219b also corrects output timings of the modulated data ($Sb_1$ to $Sb_{16}$) based on the input correction data (Dmod1 to Dmod16), respectively.

Figure 23A:
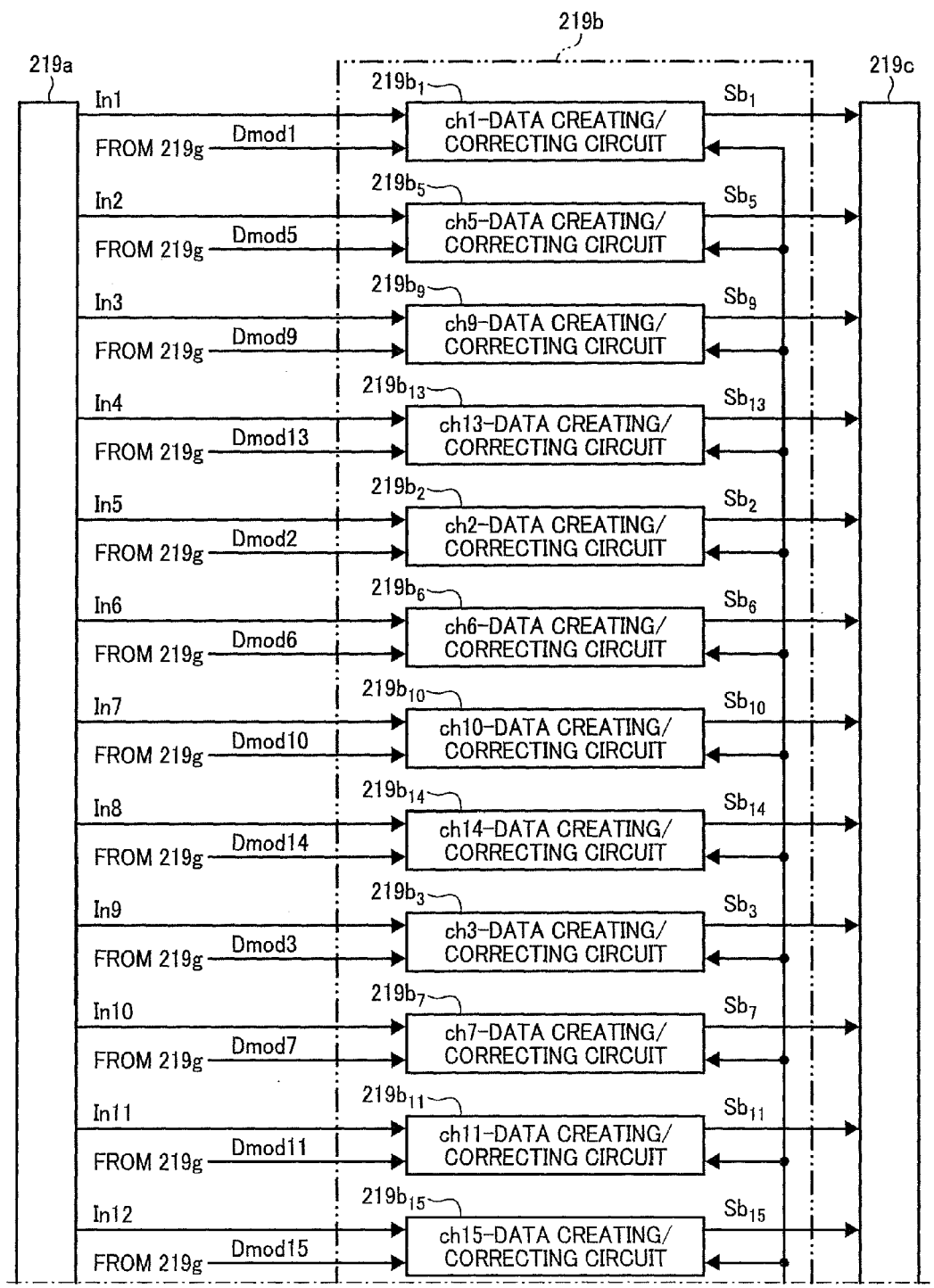
FIG. 23 is a diagram for explaining a configuration of a modulated-data creating/correcting circuit.
Figure 23B:
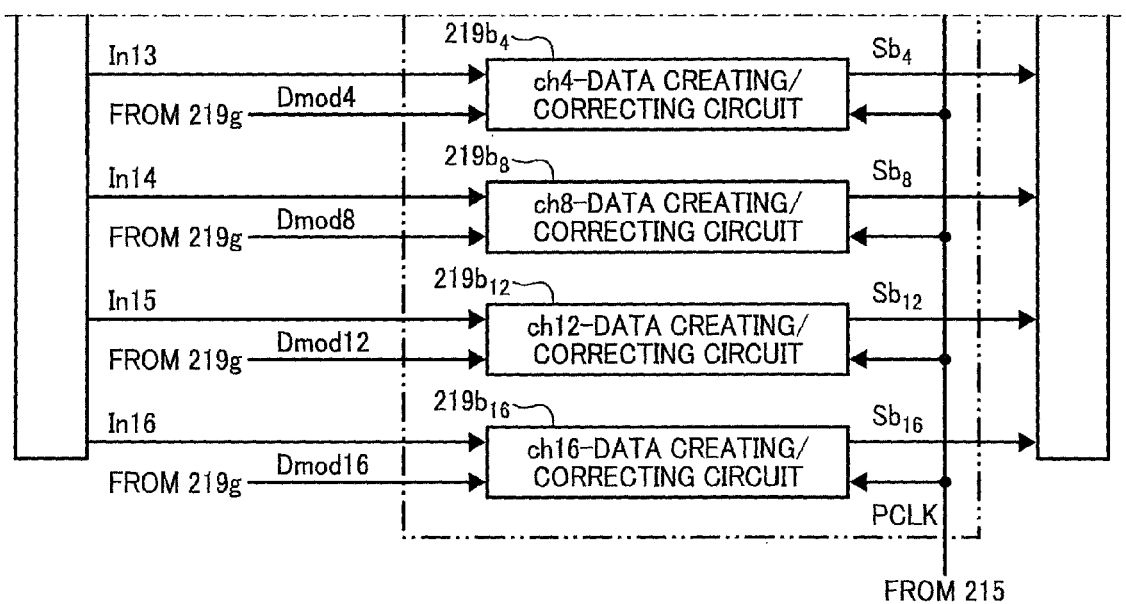

The modulated-data creating circuit 219b, as shown in FIG. 23, includes a ch1-data creating/correcting circuit $219b_1$, a ch2-data creating/correcting circuit $219b_2$, a ch3-data creating/correcting circuit $219b_3$, . . . , a ch16-data creating/correcting circuit $219b_{16}$.

All the data creating/correcting circuits have the same configuration as one another, convert corresponding image data to modulated data, and correct output timing of the modulated data based on corresponding correction data.

Figure 24:
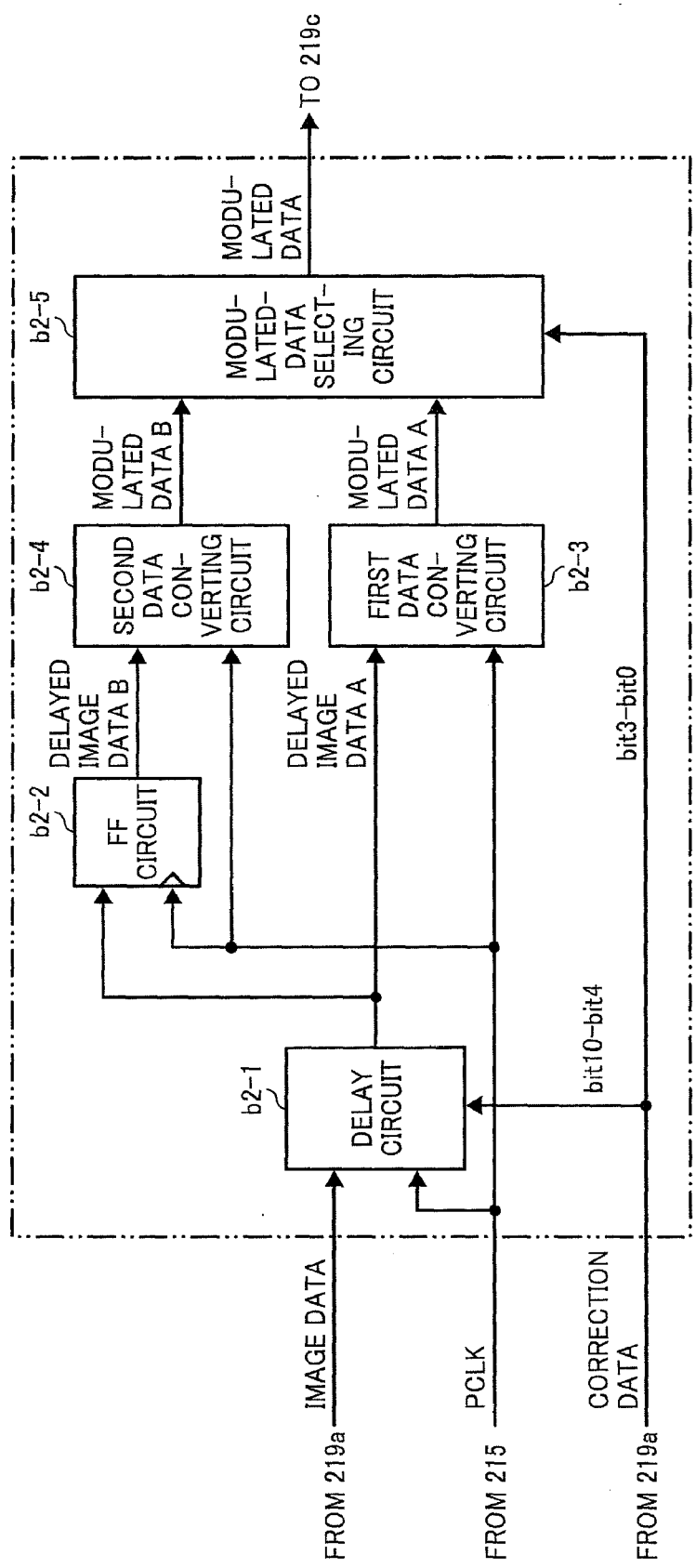
FIG. 24 is a diagram for explaining a configuration of a data creating/correcting circuit.

Here, each of the data creating/correcting circuits, as shown in FIG. 24, includes a delay circuit b2-1, an FF circuit b2-2, a first data converting circuit b2-3, a second data converting circuit b2-4, and a modulated-data selecting circuit b2-5.

The delay circuit b2-1 delays input image data by a value for higher-order 7 bits (bit 10 to bit 4) of input correction data using one pixel clock as a unit, and outputs the image data as delayed image data A.

The FF circuit b2-2 further delays the delayed image data A by one pixel clock, and outputs it as delayed image data B.

The first data converting circuit b2-3 modulates the input delayed image data A to data based on a conversion table as shown in FIG. 25, and outputs the modulated data as modulated data A.

The second data converting circuit b2-4 modulates the input delayed image data B to data based on the conversion table as shown in FIG. 25, and outputs the modulated data as modulated data B.

Here, one pixel data in both the modulated data A and the modulated data B is 16-bit data, and both the modulated data are output as parallel data to the modulated-data selecting circuit b2-5.

The modulated-data selecting circuit b2-5 refers to a selection table as shown in FIG. 26, selects 16 bits from the modulated data A and the modulated data B according to the value of the lower-order 4 bits (bit 3 to bit 0) of the input correction data, and outputs them as parallel modulated data.

For example, if the lower-order 4 bits of the correction data are "0000", bit 15 to bit 0 of the modulated data A are selected, while if the lower-order 4 bits of the correction data are "0001", bit 14 to bit 0 of the modulated data A and bit 15 of the modulated data B are selected. Furthermore, if the lower-order 4 bits of the correction data are "0010", bit 13 to bit 0 of the modulated data A and bits 15 and 14 of the modulated data B are selected, while if the lower-order 4 bits of the correction data are "0011", bit 12 to bit 0 of the modulated data A and bits 15 to 13 of the modulated data B are selected.

Figure 27:
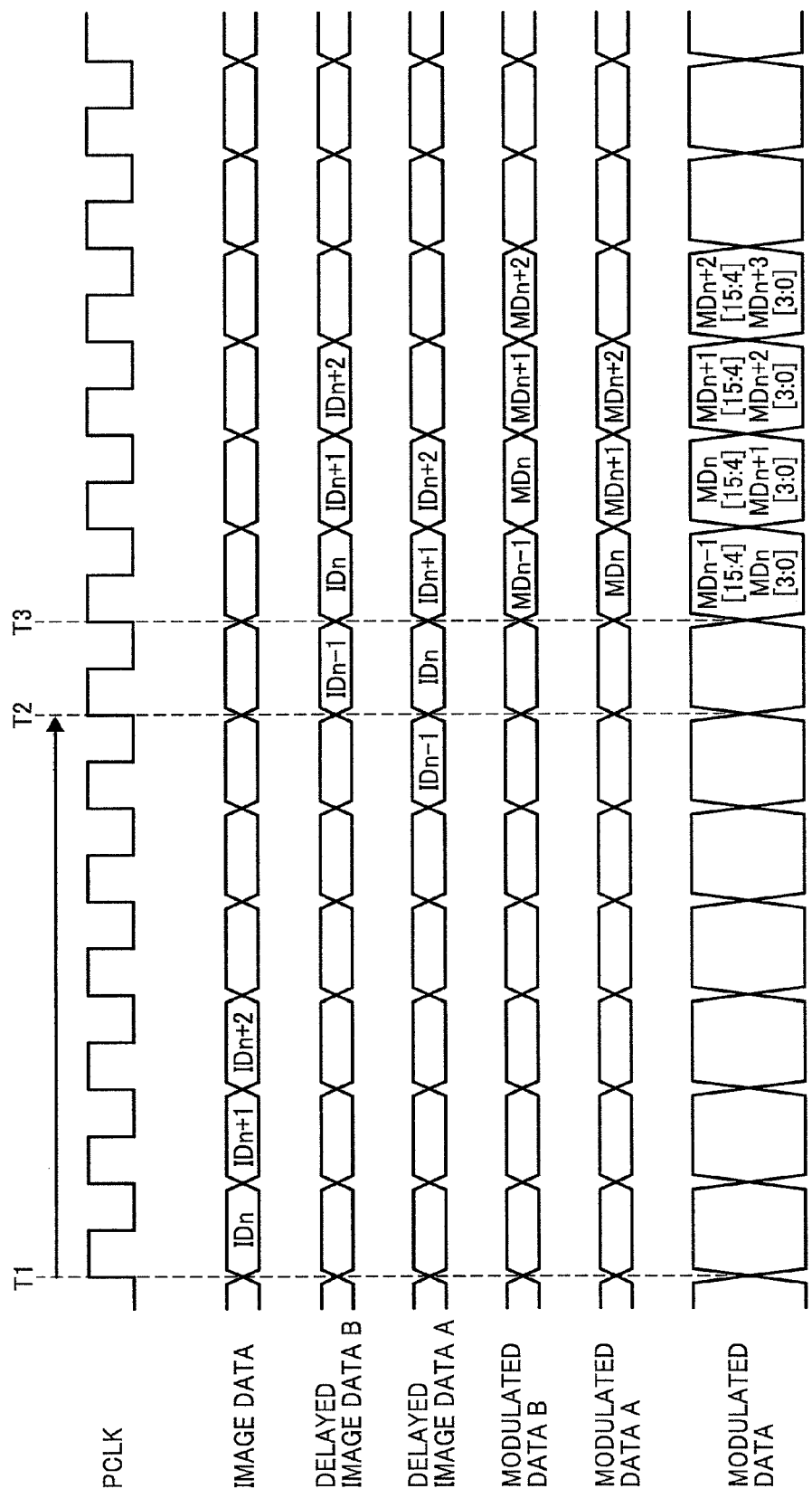
FIG. 27 is a timing chart for explaining operations of the data creating/correcting circuit.

The operations of each of the data creating/correcting circuits are explained below with reference to FIG. 27. Here, as one example, it is assumed that the correction data is "00001101100" in the binary number. Namely, the higher-order 7 bits of the correction data are set as "6" in the decimal number, and the lower-order 4 bits are set as "1100" in the binary number.

When image data is input, because the higher-order 7 bits of the correction data are set as "6", the delayed image data A is data delayed by 6 pixel clocks with respect to the image data. For example, the image data (set as IDn) input at a timing of T1 becomes data of the delayed image data A at a timing of T2 being T1+6 pixel clocks. Furthermore, the delayed image data B is data in which the delayed image data A is delayed by 1 pixel clock, and, therefore, at the timing of T2, the image data (set as IDn−1) one before the image data IDn becomes the delayed image data B.

At a timing of T3 being T2+1 pixel clock, the modulated data A is image data IDn-modulated data (set as MDn), and the modulated data B is image data IDn−1-modulated data (set as MDn−1).

At this time, because the lower-order 4 bits of the correction data are "1100" in the binary number, the modulated-data selecting circuit b2-5 selects bit 3 to bit 0 of the modulated data A and bit 15 to bit 4 of the modulated data B. In other words, MDn [3:0] and MDn−1 [15:4] are output as modulated data.

In the embodiment, because the light emission timing of the light-emitting unit ch1 is set as reference, the correction data Dmod1 of the light-emitting unit ch1 is "00000000000".

Referring back to FIG. 15, output signals ($Sb_1$ to $Sb_{16}$) of the modulated-data creating circuit 219*b* are input to the second data switching circuit 219*c*. The second data switching circuit 219*c* determines a correspondence relation between the output signals ($Sb_1$ to $Sb_{16}$) of the modulated-data creating circuit 219*b* and input signals (Dr1 to Dr16) of the PWM-data creating circuit 219*d*, based on the set content (Ssw2) of the sw2 in the DIP switch 225.

The results of determination in the second data switching circuit 219*c* are shown in FIG. 28.

Referring back to FIG. 15, the PWM-data creating circuit 219*d* converts the output signals (Dr1 to Dr16) of the second data switching circuit 219*c* to serial PWM data ($Sb_1$ to $Sb_{16}$), respectively.

Figure 29A:
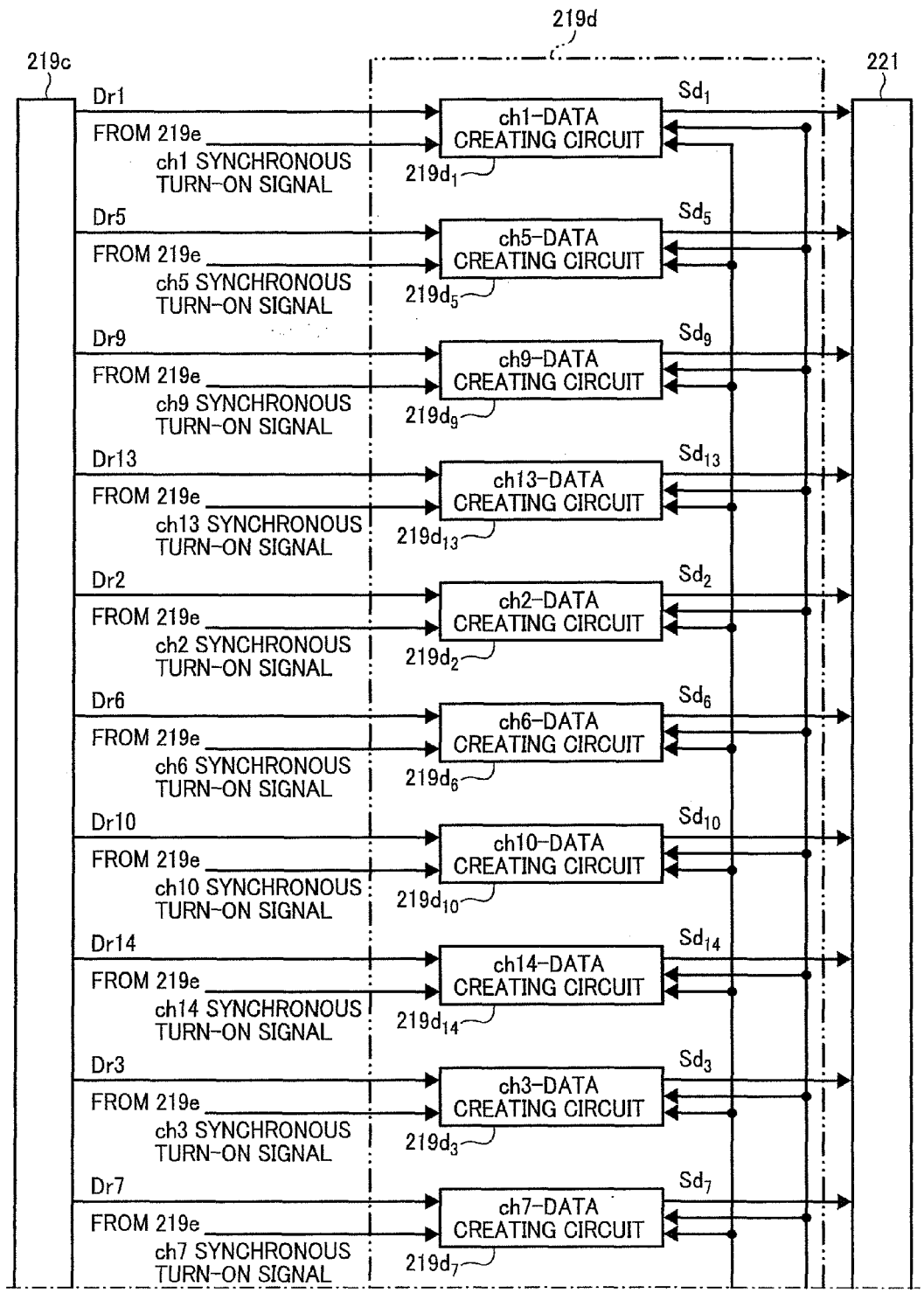
FIG. 29 is a diagram for explaining a configuration of a PWM-data creating circuit.
Figure 29B:
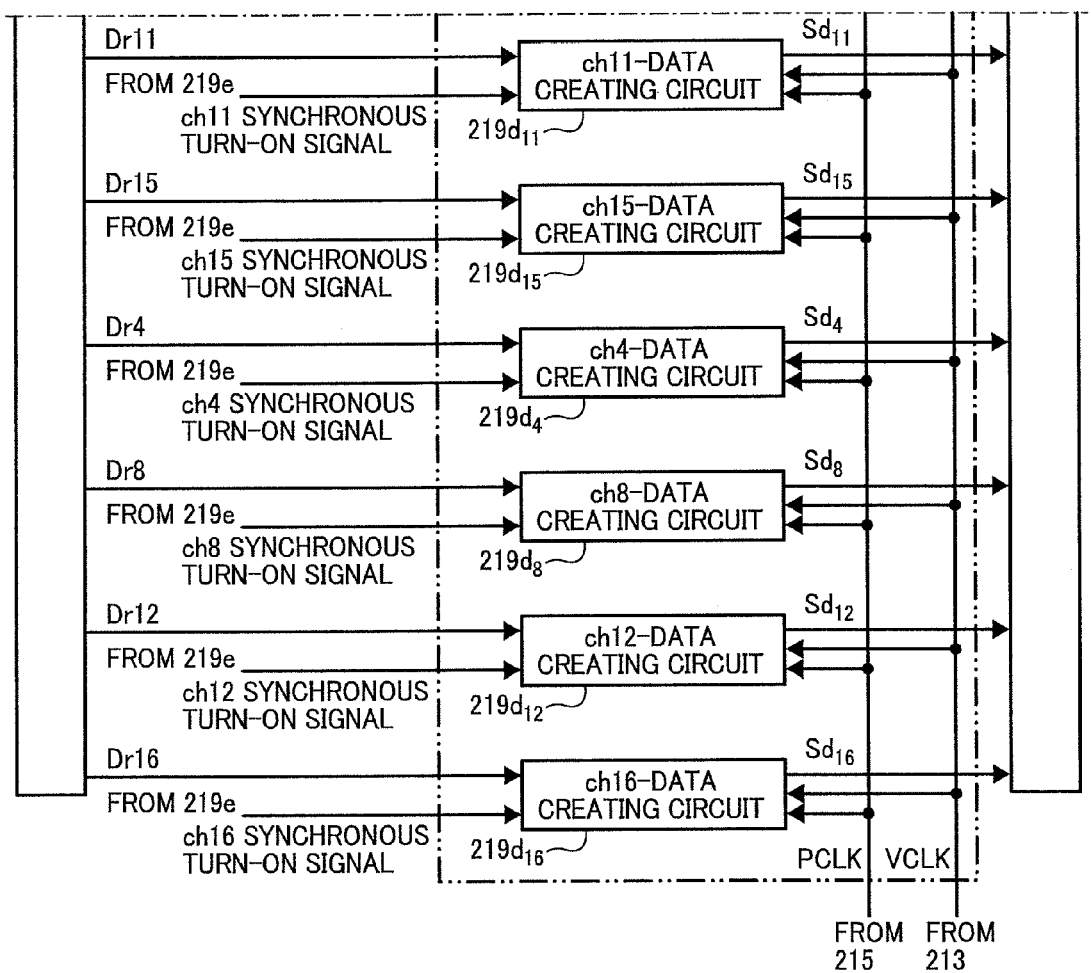

The PWM-data creating circuit 219*d*, as shown in FIG. 29, includes a ch1-data creating circuit $219d_1$ that converts the input signal Dr1 to the PWM data $Sd_1$, a ch2-data creating circuit $219d_2$ that converts the input signal Dr2 to the PWM data $Sd_2$, a ch3-data creating circuit $219d_3$ that converts the input signal Dr3 to the PWM data $Sd_3$, . . . , and a ch16-data creating circuit $219d_{16}$ that converts the input signal Dr16 to the PWM data $Sd_{16}$.

All the data creating circuits have the same configuration as one another, and convert corresponding input signal (modulated data) to serial PWM data. Here, as shown in FIG. 30 and FIG. 31 as one examples, 16-bit modulated data is output bit by bit from the lower side at rising timings of the high-frequency clock signal $VCLK_1$ and the high-frequency clock signal $VCLK_2$, namely, at each one-half of the high-frequency clock.

Figure 30:
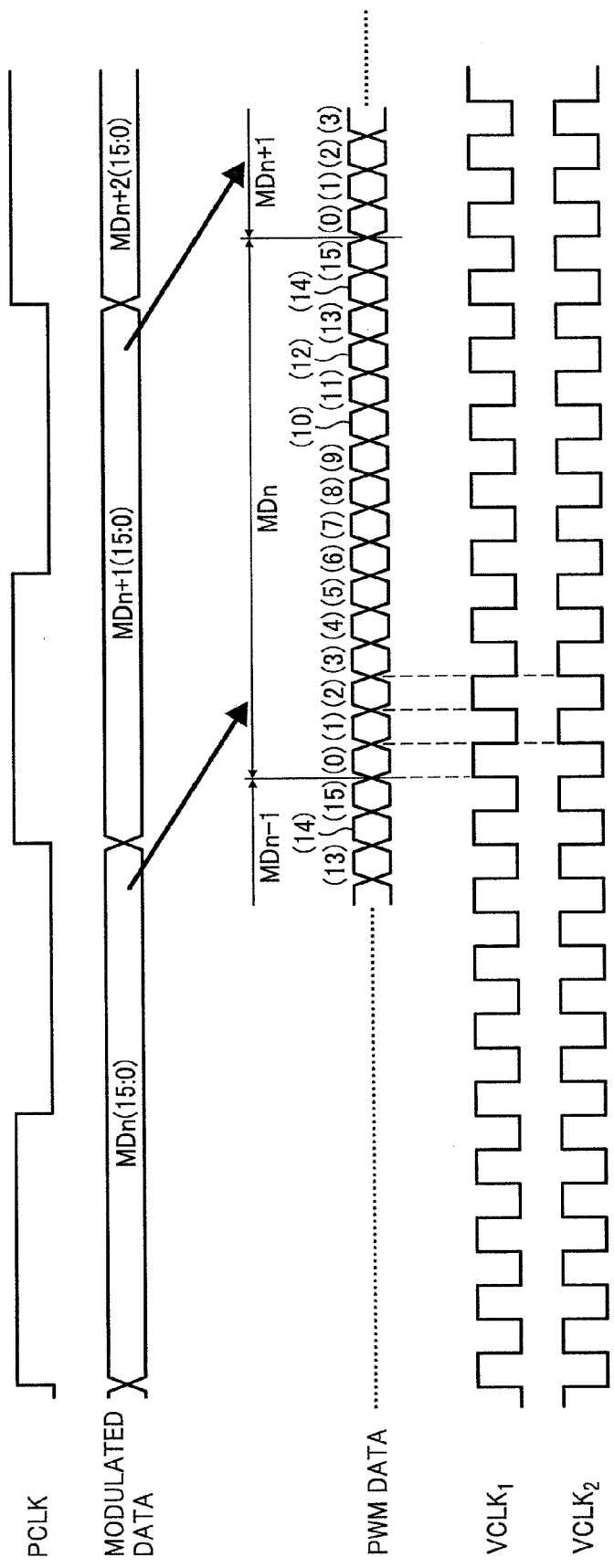
FIG. 30 is a timing chart (part 1) for explaining operations of a data creating circuit.
Figure 31:
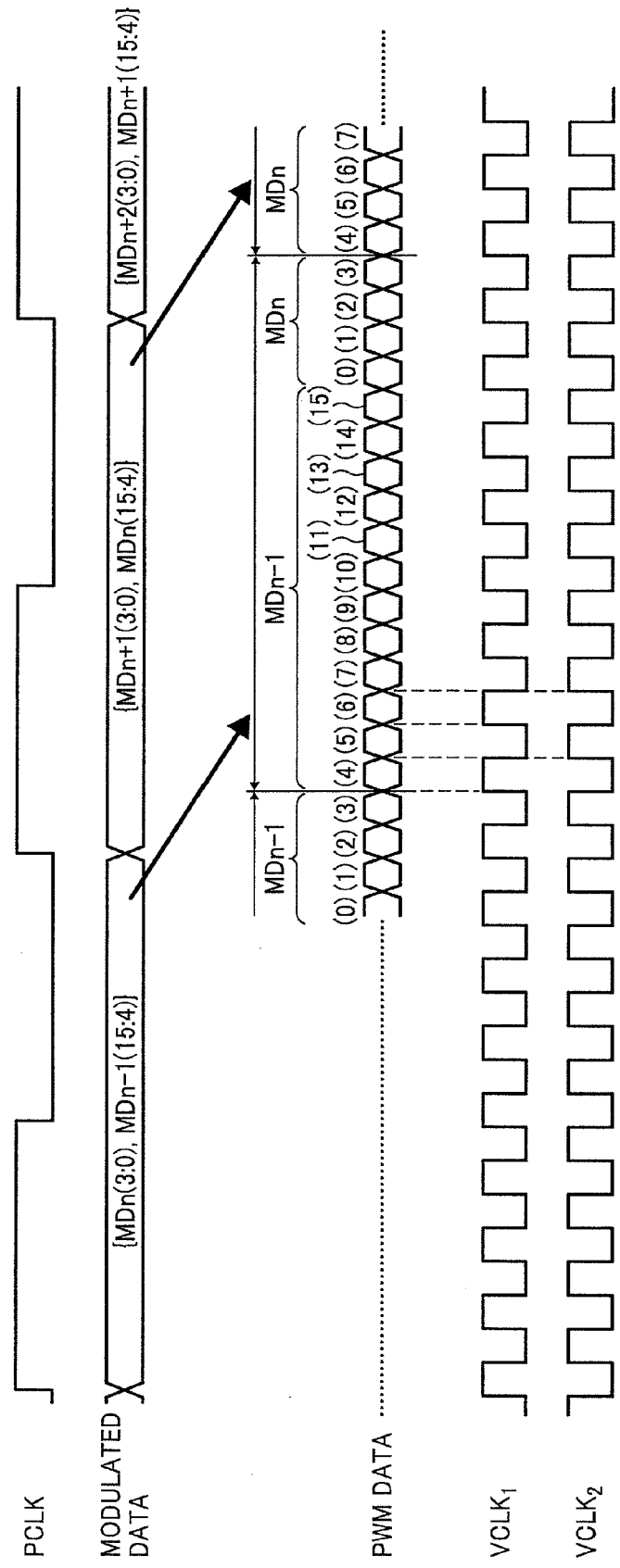
FIG. 31 is a timing chart (part 2) for explaining operations of the data creating circuit.

It should be noted that FIG. 30 represents a case in which the modulated data consists of bit 15 to bit 0 of the modulated data A, and FIG. 31 represents a case in which the modulated data consists of bit 3 to bit 0 of the modulated data A and bit 15 to bit 4 of the modulated data B. The timing at which MDn[0] is output in FIG. 31 is delayed by 12 units based on one-half of the high-frequency clock as a unit as compared with the case of FIG. 30. In this manner, a write start timing of each light-emitting unit can be delayed with an accuracy of the one-half of the high-frequency clock.

Moreover, in each of the data creating circuits, when an input synchronous turn-on signal is high logical level, the PWM data is forcefully changed to high logical level.

Referring back to FIG. 15, the light-source driving circuit 221 includes a plurality of drive units (ch1 drive unit to ch16 drive unit) corresponding to the plurality of light-emitting units (ch1 to ch16). Input to each of the drive units is corresponding PWM data from the PWM-data creating circuit 219*d*. Each output signal of the drive units is supplied to a corresponding light-emitting unit. More specifically, the light-emitting unit ch1 is driven by the ch1 drive unit based on the PWM data $Sd_1$, the light-emitting unit ch2 is driven by the ch2 drive unit based on the PWM data $Sd_2$, . . . , and the light-emitting unit ch16 is driven by the ch16 drive unit based on the PWM data $Sd_{16}$.

As is clear from the explanation, in the optical scanning device 1010 according to the embodiment, the light-source driving device is formed by the scan control unit 22.

As explained above, according to the scan control unit 22 of the embodiment, it is provided with the high-frequency clock generating circuit 213 that generates the two high-frequency clock signals ($VCLK_1$ and $VCLK_2$) having mutually different phases, the image-data creating circuit 216 that creates the plurality of image data (write data) corresponding to the plurality of light-emitting units according to image information, the write control circuit 219 that creates the plurality of modulated data corresponding to the plurality of light-emitting units from the plurality of image data and separately controls the output timings of the plurality of modulated data using the "phase-difference corresponding time" as a unit, and the light-source driving circuit 221 that drives the plurality of light-emitting units based on the plurality of PWM data output from the write control circuit 219. Thus, it is possible to control the turn-on timings of the plurality of light-emitting units in real time with higher accuracy than ever before.

The write control circuit 219 includes the first data switching circuit 219*a* that sets a correspondence relation between the image data ($S216_1$ to $S216_{16}$) and the input signals (In1 to In16) of the modulated-data creating circuit 219*b*, and the second data switching circuit 219*c* that sets a correspondence relation between the output signals ($Sb_1$ to $Sb_{16}$) of the modulated-data creating circuit 219*b* and the input signals (Dr1 to Dr16) of the PWM-data creating circuit 219*d*.

Therefore, the scan control unit 22 can align write start positions in the plurality of scan lines, and drive the plurality of light-emitting units so that a desired latent image is formed on the surface of the photosensitive drum 1030 even in any of the CASE-1 to the CASE-4. In this manner, the scan control unit 22 can achieve cost reduction of the optical scanning device and the image forming apparatus because it is excellent in versatility.

Moreover, the write control circuit 219 includes the synchronous turn-on control circuit 219e, the two-point measuring circuit 219f, and the correction-data creating circuit 219g, and thus can separately acquire each shift amount of write start timings of the image data $S216_2$ to $S216_{16}$ with respect to the image data $S216_1$ as correction data using the "phase-difference corresponding time" as a unit.

Because the modulated-data creating circuit 219b is provided, the write control circuit 219 can separately control the output timings of the plurality of modulated data using the "phase-difference corresponding time" as a unit based on the correction data so that the write start timings in the plurality of scan lines match each other.

The modulated-data creating circuit 219b includes the delay circuit b2-1 that delays an input signal by a value for the higher-order 7 bits (first correction data) of the correction data using one pixel clock as a unit, the FF circuit b2-2 that delays the output signal of the delay circuit b2-1 by one pixel clock, and the modulated-data selecting circuit b2-5 that selects a plurality of data from parallel data obtained from the output signal of the delay circuit b2-1 and from parallel data obtained from the output signal of the FF circuit b2-2 according to the value of the lower-order 4 bits (second correction data) of the correction data. Therefore, the modulated-data creating circuit 219b can control the output timings of the modulated data with a simple circuit configuration.

Furthermore, according to the optical scanning device 1010 of the embodiment, the scan control unit 22 is provided therein, which allows high-density optical scanning with high accuracy without causing a cost increase.

Even if optical characteristics of the optical components change or a positional relationship between the optical components changes due to a change in temperature or due to a change over time, the scan control unit 22 can determine correction data appropriate for the change in nearly real time, which enables the write start positions in the plurality of scan lines to be aligned stably.

According to the laser printer 1000 of the embodiment, the optical scanning device 1010 is provided therein, which resultantly allows high-quality image to be formed at a high speed without causing a cost increase.

It should be noted that the embodiment has explained the case in which the two-dimensional array 100 has the 16 light-emitting units, but it is not limited thereto.

Figure 32:
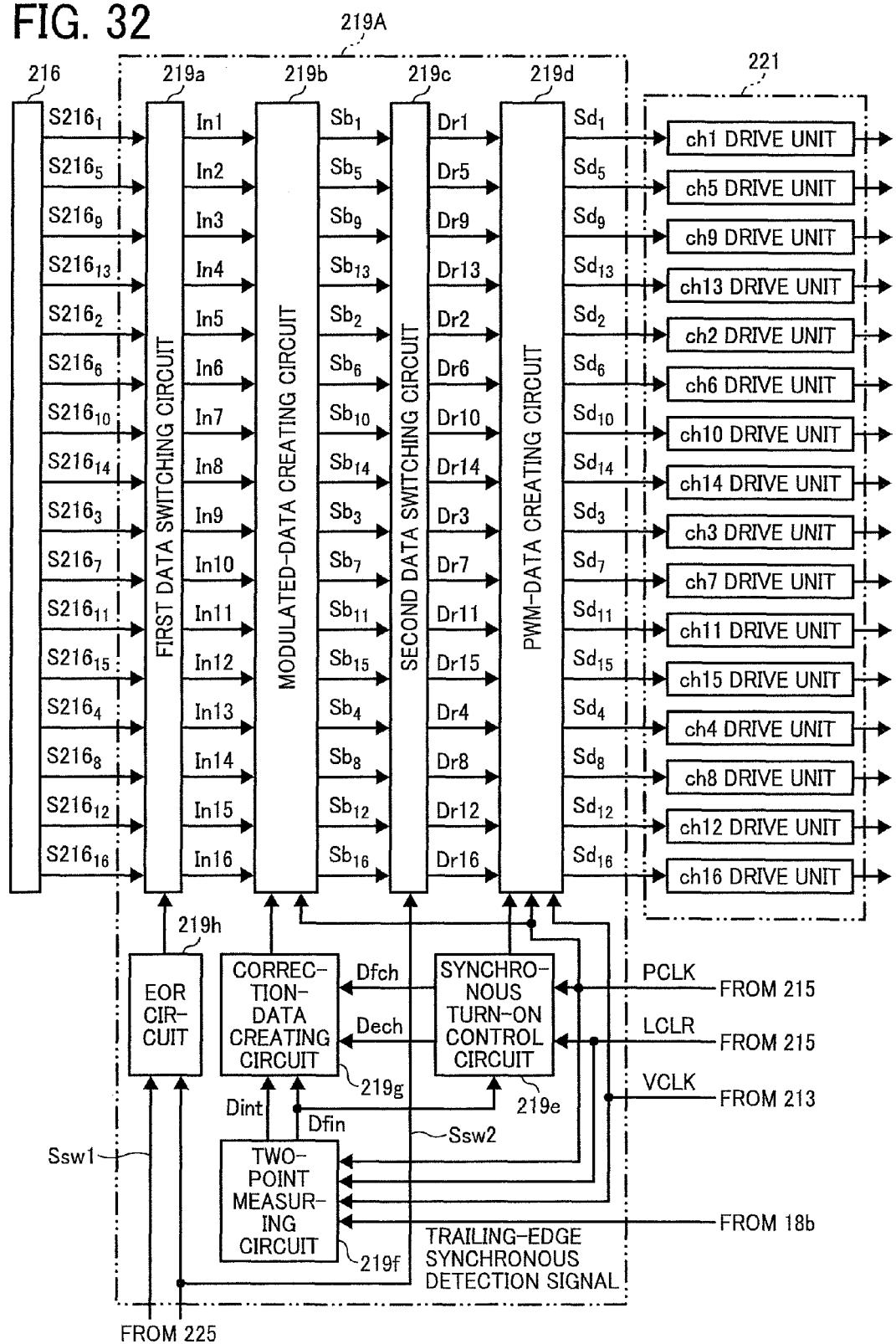
FIG. 32 is a diagram for explaining a modification of the write control circuit.

In the embodiment, a write control circuit 219A shown in FIG. 32 may be used instead of the write control circuit 219. The write control circuit 219A is configured to add an EOR circuit 219h to the write control circuit 219. In this case, as shown in FIG. 33A, when the array of a plurality of light spots is the array A, then Ssw1="L", and when it is the array B, then Ssw1="H". Further, as shown in FIG. 33B, when the main scanning direction is −Y direction, then Ssw2="L", and when it is +Y direction, then Ssw2="H".

Input to the EOR circuit 219h are both the Ssw1 and the Ssw2, and a result of exclusive OR of the two (see FIG. 34) is output from the EOR circuit 219h to the first data switching circuit 219a. The first data switching circuit 219a performs the setting according to the output signal of the EOR circuit 219h.

In this case, when the DIP switch 225 is to be set, the worker simply sets sw1 according to the array of the plurality of light spots and sets sw2 according to the main scanning direction, thus improving workability as compared with the setting according to any one of the CASE-1 to the CASE-4.

In the embodiment, the delay circuit b2-1 of each of the data creating/correcting circuits in the modulated-data creating circuit 219b may be formed with a shift register and a selector circuit. In this case, the number of stages in the shift register is determined according to each distance in the M direction between the light-emitting units as a reference and the other light-emitting units. This enables the circuit to be more efficiently configured and a circuit size to be reduced. In FIG. 35, as one example, when it is assumed that a magnification of the optical system changes in a range of 4 times to 6 times due to a change in temperature or a change over time if a resolution is 1200 dpi (21 μm/dot), the positions of second-column spots, the positions of third-column spots, and the positions of fourth-column spots from first-column spots on the surface of the photosensitive drum (surface to be scanned) at the time of simultaneously turning on all the light-emitting units are given using the number of pixels as a unit.

In this case, if the first-column light-emitting units are set as a reference, as shown in FIG. 36, a 9-stage shift register is required for the delay circuits corresponding to the second-column light-emitting units, an 18-stage shift register is required for the delay circuits corresponding to the third-column light-emitting units, and a 26-stage shift register is required for the delay circuits corresponding to the fourth-column light-emitting units.

Figure 37:
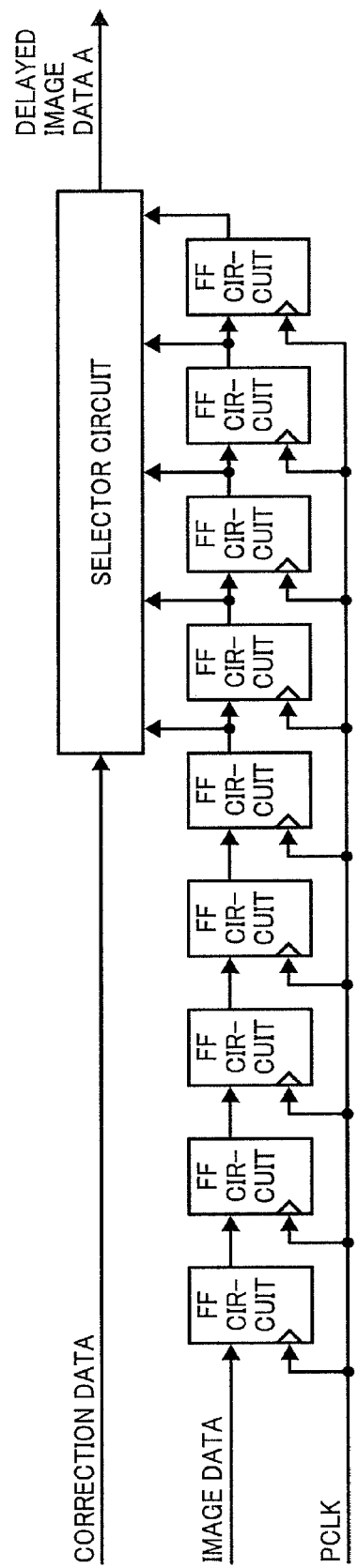
FIG. 37 is a diagram (part 3) for explaining the modification of the delay circuit in the data creating/correcting circuit.

In the delay circuits corresponding to the second-column light-emitting units, as shown in FIG. 37, output signals of shift registers at the 5th stage to the 9th stage are input to the selector circuit. The higher-order 7 bits of the correction data are also input to the selector circuit, and any one of the output signals of the shift registers at the 5th stage to the 9th stage is selected according to the value of the higher-order 7 bits of the correction data, and the selected signal is output as the delayed image data A. More specifically, if the value of the higher-order 7 bits of the correction data is set as "5", then the output signal of the shift register at the 5th stage is selected. If the value of the higher-order 7 bits of the correction data is set as "6", then the output signal of the shift register at the 6th stage is selected. If the value of the higher-order 7 bits of the correction data is set as "7", then the output signal of the shift register at the 7th stage is selected. If the value of the higher-order 7 bits of the correction data is set as "8", then the output signal of the shift register at the 8th stage is selected. If the value of the higher-order 7 bits of the correction data is set as "9", then the output signal of the shift register at the 9th stage is selected.

Moreover, in the delay circuits corresponding to the third-column light-emitting units, output signals of the shift registers at the 11th stage to the 18th stage are input to the selector circuit, and any one of the output signals is selected according to the value of the higher-order 7 bits of the correction data. Furthermore, in the delay circuits corresponding to the fourth-column light-emitting units, output signals of the shift registers at the 17th stage to the 26th stage are input to the selector circuit, and any one of the output signals is selected according to the value of the higher-order 7 bits of the correction data.

Furthermore, the embodiment has explained the case in which the two high-frequency clock signals having mutually different phases by 180 degrees are used as a plurality of high-frequency clock signals. However, the present invention is not limited thereto. For example, by using a plurality of high-frequency clock signals in which a phase difference is smaller than that, it is possible to align write start positions in the plurality of scan lines with further finer time accuracy.

Figure 38:
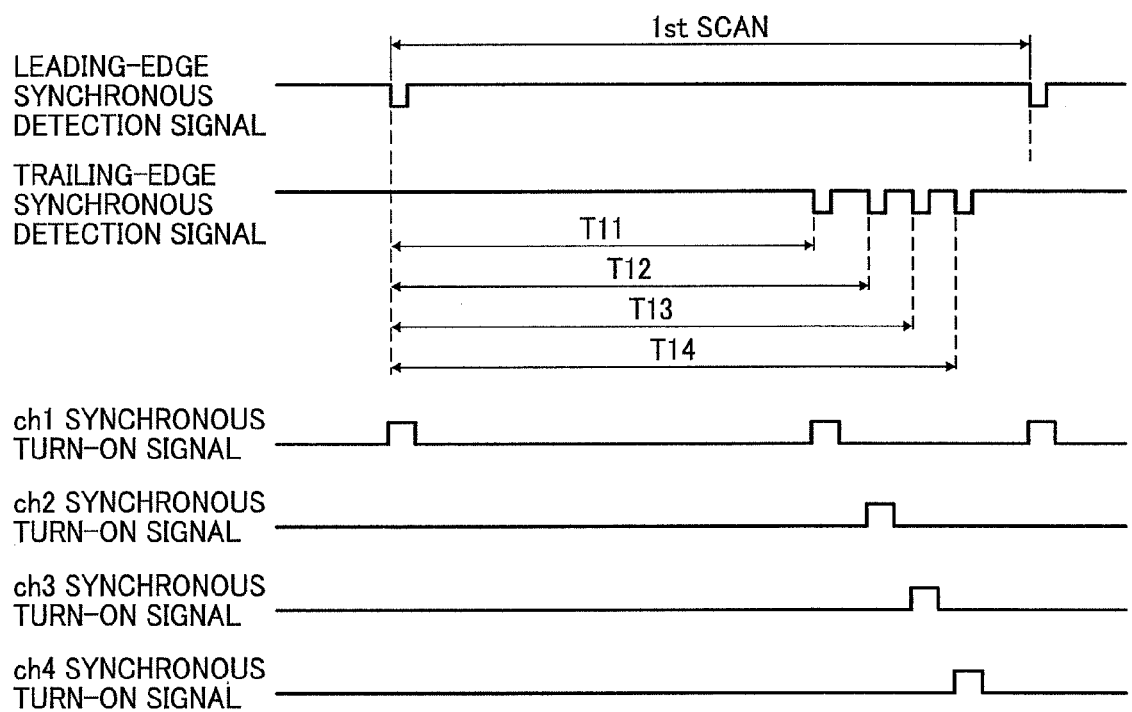
FIG. 38 is a timing chart for explaining a modification of operations of the synchronous turn-on control circuit.

Moreover, the embodiment has explained the case in which one measured data is determined at one scan, but it is not limited thereto. For example, as shown in FIG. 38, three measured data may be determined at one scan.

Furthermore, in the embodiment, if there is almost no difference among the write start positions of the light-emitting units in the same column (for example, light-emitting units ch1, ch5, ch9, and ch13), leading-edge column information capable of specifying the column may be used instead of the leading-edge ch information Dfch. Likewise, rear-end column information capable of specifying the column may be used instead of the trailing-edge ch information Dech. In this case, the correction data is created for each column.

Moreover, the embodiment has explained the case in which the first-column light-emitting units, the second-column light-emitting units, the third-column light-emitting units, and the fourth-column light-emitting units are equally spaced in the M direction, but it is not limited thereto.

Furthermore, the embodiment has explained the case in which the second data switching circuit 219c is provided between the modulated-data creating circuit 219b and the PWM-data creating circuit 219d, but it is not limited thereto. As shown in FIG. 39, a second data switching circuit 219c' may be provided at a subsequent stage of the delay circuits b2-1 in the data creating/correcting circuits of the modulated-data creating circuit 219b. The results of determination in the second data switching circuit 219c' are shown in FIG. 40.

It should be noted that the embodiment has explained the case in which the laser printer 1000 is used as the image forming apparatus, but it is not limited thereto. In short, it may be any image forming apparatus if the optical scanning device 1010 is provided therein. For example, it is suitable for a copier, a facsimile, or for a multifunction product integrally provided with these devices.

Moreover, it may be an image forming apparatus that directly emits a laser beam to a medium (e.g., paper) on which color is caused to develop by the laser beam.

Furthermore, it may be an image forming apparatus that uses silver salt film as an image carrier. In this case, a latent image is formed on the silver salt film by optical scanning, and the latent image can be visualized through a process equivalent to a developing process in an ordinary silver halide photographic process. The visualized image can be transferred to a developing paper through a process equivalent to a printing process in the ordinary silver halide photographic process. This type of image forming apparatus can be implemented as an optical plate-making device and an optical drawing device that draws CT scanned image or the like.

Figure 41:
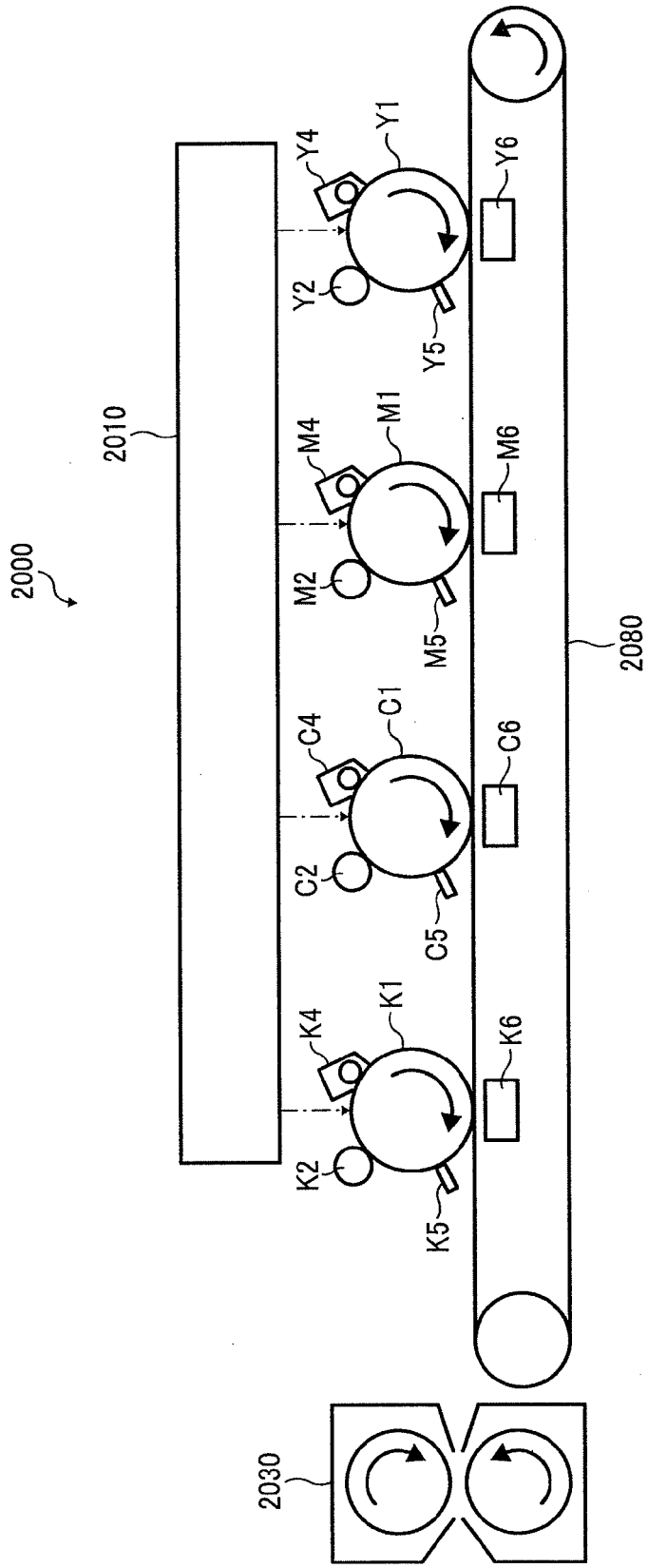
FIG. 41 is a diagram representing a schematic configuration of a color printer according to an embodiment of the present invention.

Moreover, as shown in FIG. 41 as one example, it may be a color printer 2000 provided with a plurality of photosensitive drums.

The color printer 2000 is a tandem-type multi-color printer that forms a full-color image by superimposing four colors (black, cyan, magenta, and yellow) on one after another. The color printer 2000 includes "a photosensitive drum K1, a charging unit K2, a developing unit K4, a cleaning unit K5, and a transfer unit K6" for black, "a photosensitive drum C1, a charging unit C2, a developing unit C4, a cleaning unit C5, and a transfer unit C6" for cyan, "a photosensitive drum M1, a charging unit M2, a developing unit M4, a cleaning unit M5, and a transfer unit M6" for magenta, "a photosensitive drum Y1, a charging unit Y2, a developing unit Y4, a cleaning unit Y5, and a transfer unit Y6" for yellow, an optical scanning device 2010, a transfer belt 2080, and a fixing unit 2030.

Each of the photosensitive drums is made to rotate in an arrow direction in FIG. 41, and the charging unit, the developing unit, the transfer unit, and the cleaning unit are arranged around each of the photosensitive drums along its rotation direction. Each of the charging units uniformly charges the surface of the corresponding photosensitive drum. The light is irradiated by the optical scanning device 2010 to the surface of each of the photosensitive drums charged by the charging unit, so that an electrostatic latent image is formed on each of the photosensitive drums. A toner image is formed on the surface of each of the photosensitive drums by a corresponding developing unit. Furthermore, the toner image of each color is transferred to a recording paper by a corresponding transfer unit, and the image is finally fixed on the recording paper by the fixing unit 2030.

The optical scanning device 2010 includes a light source similar to the light source 14 and a scan control unit similar to the scan control unit 22 for each color. This allows the optical scanning device 2010 to have the same effect as that of the optical scanning device 1010 and the color printer 2000 to have the same effect as that of the laser printer 1000.

It should be noted that in the color printer 2000, any optical scanning device similar to the optical scanning device 1010 may be used for each color instead of the optical scanning device 2010.

According to one aspect of the present invention, excellent versatility can be achieved, and it is possible to control light emitting timings of the light-emitting units with high accuracy in real time.

Moreover, it is possible to perform high-density optical scanning with high accuracy without causing a cost increase.

Furthermore, it is possible to form a high-quality image at a high speed without causing a cost increase.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light-source driving device used for driving a plurality of light-emitting units in an optical scanning device that optically scans a surface to be scanned with light fluxes emitted from the plurality of light-emitting units in a main scanning direction, the light-source driving device comprising:
 a high-frequency clock generating circuit that generates a plurality of high-frequency clock signals having mutually different phases;
 a write-data creating circuit that creates a plurality of write data corresponding to the plurality of light-emitting units according to image information; and
 a modulated-data control circuit that creates a plurality of modulated data corresponding to the plurality of light-emitting units from the plurality of write data based on at least one of a relation between an array of the plurality of light-emitting units and an array of a plurality of light spots formed on the surface to be scanned and a relation between the surface to be scanned and the main scanning direction, and separately controls output timings of the plurality of modulated data using a time, as a unit, corresponding to a phase difference between the plurality of high-frequency clock signals, wherein the modulated-data control circuit includes:
 a control circuit that controls a correspondence relation between the plurality of light-emitting units and the plurality of modulated data based on the relation between the array of the plurality of light-emitting units and the array of the plurality of light spots and the relation between the surface to be scanned and the main scanning direction,
 a correction-data acquiring circuit that separately acquires an amount of shift between start timings of write to the surface to be scanned as correction data including data in which the time corresponding to a phase difference between the plurality of high-frequency clock signals is set as a unit, and an adjusting circuit that separately adjusts output timings of the plurality of modulated data using the phase difference, as a unit, of the plurality of high-frequency clock signals based on the correction data acquired by the correction-data acquiring circuit so that the start timings of write to the surface to be scanned match each other; and wherein the light-source driving device further includes a driving circuit that drives the plurality of light-emitting units based on the plurality of modulated data output from the modulated-data control circuit.

2. The light-source driving device according to claim 1, wherein a pixel clock signal generated from at least one of a plurality of high-frequency clock signals generated by the high-frequency clock generating circuit is input to the modulated-data control circuit, and the correction-data acquiring circuit divides the amount of shift into a first amount of shift which is an integral multiple of a period of the pixel clock signal and a second amount of shift which is less than one period of the rest of the pixel clock signals, acquires first correction data, from the first amount of shift, in which the period of the pixel clock signal is set as a unit, and acquires second correction data, from the second amount of shift, in which the time corresponding to the phase difference between the plurality of high-frequency clock signals is set as a unit.

3. The light-source driving device according to claim 2, wherein the adjusting circuit includes a first delay circuit that sets the period of the pixel clock signal as a unit, and delays modulated data by the time corresponding to the first correction data to be output; a second delay circuit that delays output signal of the first delay circuit by one period of the pixel clock signal to be output; and a data selecting circuit that selects a plurality of data according to the second correction data, from data obtained from the output signal of the first delay circuit and data obtained from the output signal of the second delay circuit.

4. The light-source driving device according to claim 3, wherein the control circuit includes a first switching circuit that is provided at a previous stage of the adjusting circuit and determines output ends of the plurality of write data to the adjusting circuit based on the relation between the array of the plurality of light-emitting units and the array of the plurality of light spots and the relation between the surface to be scanned and the main scanning direction; and a second switching circuit that is provided at a subsequent stage of the first delay circuit and determines output ends of the output signal of the first delay circuit and of the second correction data to the second delay circuit and to the data selecting circuit based on the relation between the array of the plurality of light-emitting units and the array of the plurality of light spots and the relation between the surface to be scanned and the main scanning direction.

5. The light-source driving device according to claim 3, wherein the first delay circuit includes a multi-stage shift register, and a number of stages thereof are determined according to an array of the plurality of light-emitting units.

6. The light-source driving device according to claim 2, wherein the optical scanning device includes a first light-receiving element on which a light before writing is started is incident through an optical system; and a second light-receiving element on which a light after the writing is ended is incident through the optical system, a first synchronization signal being an output signal of the first light-receiving element and a second synchronization signal being an output signal of the second light-receiving element are input to the modulated-data control circuit, and the correction-data acquiring circuit acquires the amount of shift based on the first synchronization signal, the second synchronization signal, the plurality of high-frequency clock signals, and the pixel clock signal.

7. The light-source driving device according to claim 6, wherein the correction-data acquiring circuit acquires the amount of shift of a second light-emitting unit with respect to a first light-emitting unit from a difference between a time from reception of a light of the first light-emitting unit among the plurality of light-emitting units by the first light-receiving element to reception of the light by the second light-receiving element, and a time from reception of the light of the first light-emitting unit by the first light-receiving element to reception of a light from the second light-emitting unit among the plurality of light-emitting units by the second light-receiving element.

8. The light-source driving device according to claim 7, wherein the correction-data acquiring circuit acquires the amount of shift of one light-emitting unit at one scan.

9. The light-source driving device according to claim 7, wherein the correction-data acquiring circuit acquires the amount of shift of two or more light-emitting units at one scan.

10. The light-source driving device according to claim 1, wherein the control circuit includes a first switching circuit that is provided at a previous stage of the adjusting circuit and determines output ends of the plurality of write data to the adjusting circuit based on the relation between the array of the plurality of light-emitting units and the array of the plurality of light spots and the relation between the surface to be scanned and the main scanning direction; and a second switching circuit that is provided at a subsequent stage of the adjusting circuit and determines output ends of the plurality of modulated data to the driving circuit based on the relation between the array of the plurality of light-emitting units and the array of the plurality of light spots and the relation between the surface to be scanned and the main scanning direction.

11. An optical scanning device that scans a surface to be scanned with a plurality of light fluxes in a main scanning direction, the optical scanning device comprising: a light source that includes a plurality of light-emitting units arrayed so that their positions with respect to a direction corresponding to at least a direction of a scan line are mutually different from each other; a light-source driving device according to claim 1 that drives the light source; and an optical system that collects the plurality of light fluxes emitted from the light source on the surface to be scanned, and moves a plurality of light spots on the surface to be scanned in the main scanning direction.

12. The optical scanning device according to claim 11, wherein the light source includes a surface-emitting laser array.

13. An image forming apparatus comprising: at least one image carrier; and at least one optical scanning device according to claim 11 that scans a light flux modulated according to image information to the at least one image carrier.

14. The image forming apparatus according to claim 13, wherein the image information is multicolor image information.

* * * * *